US012684091B2

(12) United States Patent
Rhodes et al.

(10) Patent No.: US 12,684,091 B2
(45) Date of Patent: Jul. 14, 2026

(54) DIGITAL ITEM MANAGEMENT AND RANDOMIZATION TECHNIQUES IN AN ONLINE PLATFORM

(71) Applicant: WHATNOT INC., San Francisco, CA (US)

(72) Inventors: Ryan Rhodes, Culver City, CA (US); Alexander Russell, Austin, TX (US); Alexander Chase, Los Angeles, CA (US); Kyle McDowell, San Diego, CA (US)

(73) Assignee: WHATNOT, INC., San Francisco, CA (US)

( * ) Notice: Subject to any disclaimer, the term of this patent is extended or adjusted under 35 U.S.C. 154(b) by 333 days.

(21) Appl. No.: 18/375,221

(22) Filed: Sep. 29, 2023

(65) Prior Publication Data

US 2024/0114112 A1 Apr. 4, 2024

Related U.S. Application Data

(60) Provisional application No. 63/411,889, filed on Sep. 30, 2022.

(51) Int. Cl.
| | |
|---|---|
| *G06F 3/048* | (2013.01) |
| *G06T 13/80* | (2011.01) |
| *H04N 7/15* | (2006.01) |

(52) U.S. Cl.
CPC ............. *H04N 7/157* (2013.01); *G06T 13/80* (2013.01)

(58) Field of Classification Search
CPC ............. H04N 7/157; H04N 21/47815; H04N 21/2187; G06T 13/80
See application file for complete search history.

(56) References Cited

U.S. PATENT DOCUMENTS

| | | | |
|---|---|---|---|
| 2008/0195503 A1* | 8/2008 | Habeishi ................ | G06Q 30/00 705/26.1 |
| 2008/0288362 A1* | 11/2008 | King .................. | G06Q 30/0641 705/26.8 |
| 2021/0065353 A1* | 3/2021 | Potter ................... | G06T 11/60 |
| 2021/0144452 A1* | 5/2021 | Cutaia ............. | H04N 21/23614 |
| 2025/0217875 A9* | 7/2025 | Rapaport ........... | G06Q 30/0239 |

* cited by examiner

*Primary Examiner* — Haoshian Shih
(74) *Attorney, Agent, or Firm* — MARSHALL, GERSTEIN & BORUN LLP

(57) ABSTRACT

A mobile software application by which a user may stream, from a unique host user profile associated with the user, an online session being associated with one or more items available for sale from the user (e.g., available for auction). One or more graphical user interfaces of the application enable mobile devices of external users to access the host user's online session by displaying a real-time video stream in conjunction with one or more images/videos associated with the available product(s). These external users may use the GUI(s) to participate in the auction of the product(s), e.g., by placing bids, within the host user's online session. The host user may utilize one or more fully integrated services and features that enable the host user to more efficiently and easily conduct the online session.

20 Claims, 20 Drawing Sheets

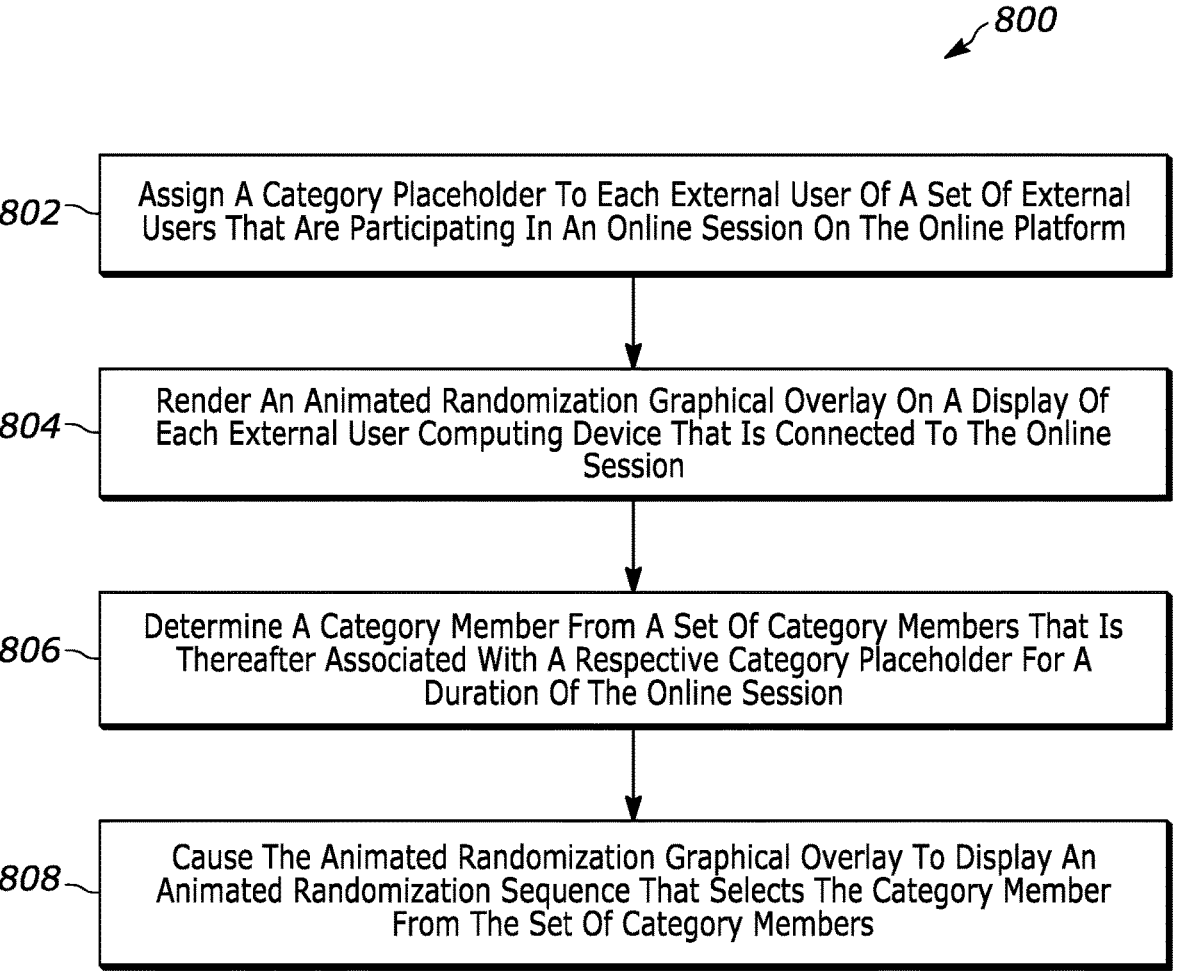

802 — Assign A Category Placeholder To Each External User Of A Set Of External Users That Are Participating In An Online Session On The Online Platform 804 — Render An Animated Randomization Graphical Overlay On A Display Of Each External User Computing Device That Is Connected To The Online Session 806 — Determine A Category Member From A Set Of Category Members That Is Thereafter Associated With A Respective Category Placeholder For A Duration Of The Online Session 808 — Cause The Animated Randomization Graphical Overlay To Display An Animated Randomization Sequence That Selects The Category Member From The Set Of Category Members

FIG. 8A

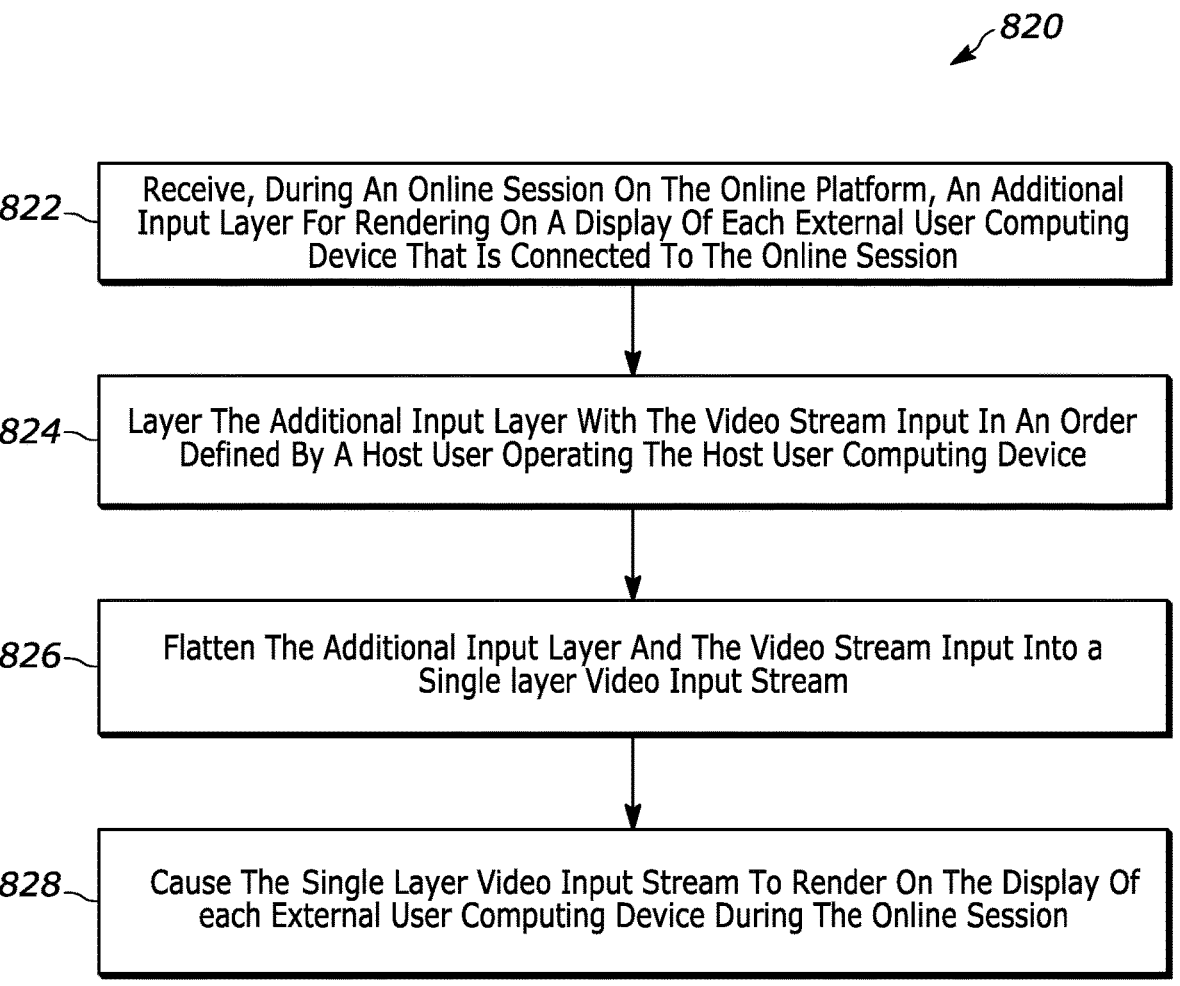

822 — Receive, During An Online Session On The Online Platform, An Additional Input Layer For Rendering On A Display Of Each External User Computing Device That Is Connected To The Online Session 824 — Layer The Additional Input Layer With The Video Stream Input In An Order Defined By A Host User Operating The Host User Computing Device 826 — Flatten The Additional Input Layer And The Video Stream Input Into a Single layer Video Input Stream 828 — Cause The Single Layer Video Input Stream To Render On The Display Of each External User Computing Device During The Online Session

FIG. 8B

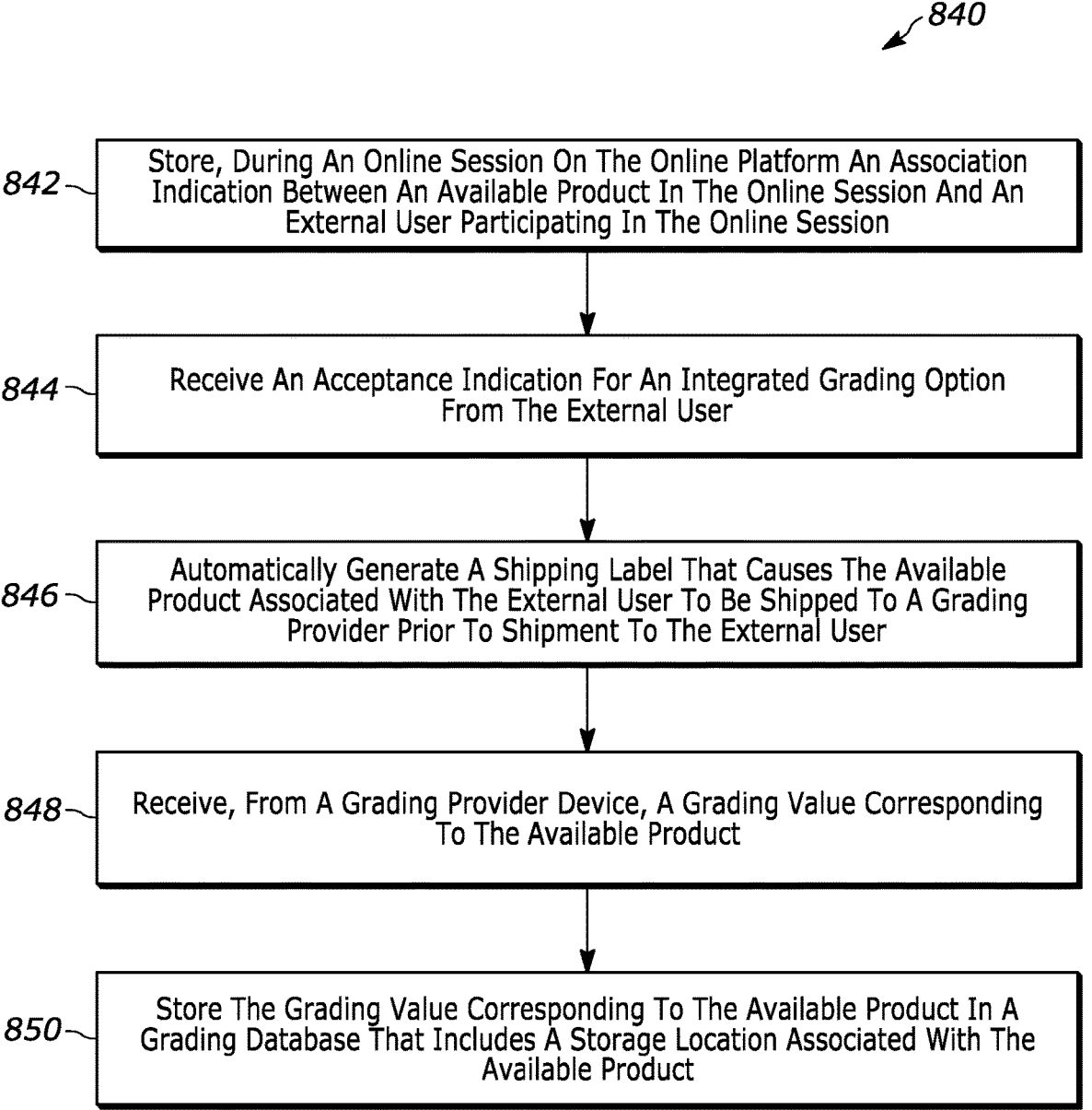

_840_

842 — Store, During An Online Session On The Online Platform An Association Indication Between An Available Product In The Online Session And An External User Participating In The Online Session 844 — Receive An Acceptance Indication For An Integrated Grading Option From The External User 846 — Automatically Generate A Shipping Label That Causes The Available Product Associated With The External User To Be Shipped To A Grading Provider Prior To Shipment To The External User 848 — Receive, From A Grading Provider Device, A Grading Value Corresponding To The Available Product 850 — Store The Grading Value Corresponding To The Available Product In A Grading Database That Includes A Storage Location Associated With The Available Product

FIG. 8C

DIGITAL ITEM MANAGEMENT AND RANDOMIZATION TECHNIQUES IN AN ONLINE PLATFORM

CROSS-REFERENCE TO RELATED APPLICATIONS

This application claims priority to U.S. Provisional Patent Application No. 63/411,889, entitled "Digital Item Management and Randomization Techniques in an Online Platform," filed on Sep. 30, 2022, the disclosure of which is hereby incorporated herein by reference.

TECHNICAL FIELD

The present disclosure generally relates to online platform functionality, and more specifically, to digital item management and randomization techniques in an online platform.

BACKGROUND OF THE DISCLOSURE

Recently, many entities have created interactive electronic services available via mobile computing devices, where previously such services might have only been available at most via desktop and/or laptop computers. In particular, these entities have created online platforms that enable multiple remote users to collectively access these interactive electronic services. Such electronic services have included, for example, auctions of consumer goods, including collectible items such as trading cards, toys, figurines, comic books, video games etc.

Conventional online platforms enable a central or "host" user to interact with multiple participants during a real-time video/audio stream (generally referenced as an "online session"), but these conventional online platforms suffer from several significant drawbacks. For example, in a conventional online auction platform, the host user is required to manually randomize category assignments for certain auctions (e.g., card breaks), manually track category assignments for participants, manually enter any data corresponding to the items for auction into the online platform. Further, the host user is typically unable to include additional video/audio effects to the online session due to bandwidth limitations, and the host user is also generally unable to obtain grading/authentication services for newly-opened auction items due to a lack of transparency between the host user and the participants. These drawbacks of conventional online platforms result in, inter alia, poorly randomized category assignments, erroneous product shipments, and minimal user confidence/engagement. Simply put, conventional online platforms fail to provide fully integrated services and features, and as a result, such platforms reduce the efficiency of interactions/transactions taking place as part of the real-time video/audio stream and create an unsavory user experience.

Accordingly, a need exists for systems and methods of digital item management and randomization techniques in an online platform that enable a host user to more efficiently and easily conduct an online session.

SUMMARY

Generally speaking, the embodiments of the present disclosure may include a seller or "host" user offering multiple items consecutively for auction via an online session that comprises a live auction event. In the live auction event, the host's device records a real-time video/audio stream, which prospective bidders or "guests" (also referenced herein as an "external user") can view in conjunction with a graphical user interface (GUI) that enables the guests to send and receive communications regarding the auction(s) (e.g., bids, comments, updates to items, etc.) substantially in real-time. As previously mentioned, conventional online platforms suffer from a lack of services and features for host users, such that a live auction event on a conventional online platform can also suffer in many significant ways.

As an example, a common live auction event includes opening and auctioning collectible card packs (referenced herein as "card breaking" or a "card break"). Card breaks generally involve a host user charging guests for the opportunity to keep cards from a card pack or box. In certain types of card breaks, guests may purchase a number of slots (referenced herein as a "category placeholder") that are associated with the various categories of cards (e.g., sports teams, sports divisions) included in the pack/box, and the guests may receive category assignments at the beginning of the auction. Such category assignments may be explicitly priced and assigned for particular categories (e.g., $20 for cards of category A, $5 for cards of category B) or randomized for a flat rate per slot (e.g., $10 for a randomly assigned category). In any event, once the categories are assigned, the host user may proceed to reveal each card in the pack/box. After the host user reveals each card in the pack/box, the host user packs and ships the cards to the various guests based on the category assignments. Namely, a first user with a category A assignment receives all cards of category A, and a second user with a category B assignment receives all cards of category B.

Problematically, the host user is typically responsible for manually performing many/most of these tasks associated with a card break. In particular, uploading card data prior to or during the live auction, randomizing category assignments for guests, notifying guests of their respective assignments, and tracking those assignments and the corresponding card categories are all responsibilities the host user must independently undertake. Moreover, many guests desire to have their newly-opened cards graded after the auction, but the host user is typically unable to provide such grading services. Taken together, these issues result in a frustrating user experience for host users that can lead to mismanaged category assignments, erroneously shipped products (e.g., category A cards shipped to a user with a category B assignment), and a litany of guest complaints due to a lack of transparency regarding category assignment randomization and a lack of additional services (e.g., grading).

In view of these needs, the present disclosure describes systems and methods that provide host users with certain fully integrated services and features as part of an online session. In particular, the present disclosure includes a suite of services and features available to a host user as part of a mobile application that accesses an online platform to conduct online sessions. These services and features generally include a randomization algorithm and corresponding animated randomization graphical overlay, input layer flattening for additional input layers with the real-time video stream of the online session, an integrated grading option to automatically and seamlessly connect host users and guests to graders, and a machine vision algorithm configured to extract metadata from images of available products featured as part of an online session. As a result of these services and features, and combinations thereof, the systems and methods of the present disclosure overcome the issues experienced by conventional online platforms.

In embodiments, a system for digital item management and randomization techniques in an online platform is provided. The system comprises one or more processors and one or more memories storing non-transitory computer executable instructions. When executed via the one or more processors, the non-transitory computer executable instructions cause the one or more processors to: assign a category placeholder to each external user of a set of external users that are participating in an online session on the online platform, render an animated randomization graphical overlay on a display of each external user computing device that is connected to the online session, each external user computing device operating on behalf of an external user, determine, by a randomization algorithm, a category member from a set of category members that is thereafter associated with a respective category placeholder for a duration of the online session, and cause the animated randomization graphical overlay to display an animated randomization sequence that selects the category member from the set of category members on the display of each external user computing device that is connected to the online session.

In other embodiments, a computer-implemented method performed via one or more processors for digital item management and randomization techniques in an online platform is provided. The method comprises assigning, by a host user computing device, a category placeholder to each external user of a set of external users that are participating in an online session on the online platform; rendering an animated randomization graphical overlay on a display of each external user computing device that is connected to the online session, each external user computing device operating on behalf of an external user; determining, by a randomization algorithm, a category member from a set of category members that is thereafter associated with a respective category placeholder for a duration of the online session; and causing the animated randomization graphical overlay to display an animated randomization sequence that selects the category member from the set of category members on the display of each external user computing device that is connected to the online session.

In other embodiments, one or more computer readable media storing non-transitory computer executable instructions for digital item management and randomization techniques in an online platform are provided. When executed via one or more processors of one or more servers, the non-transitory computer executable instructions cause the one or more servers to: assign a category placeholder to each external user of a set of external users that are participating in an online session on the online platform; render an animated randomization graphical overlay on a display of each external user computing device that is connected to the online session, each external user computing device operating on behalf of an external user; determine, by a randomization algorithm, a category member from a set of category members that is thereafter associated with a respective category placeholder for a duration of the online session; and cause the animated randomization graphical overlay to display an animated randomization sequence that selects the category member from the set of category members on the display of each external user computing device that is connected to the online session.

In other embodiments, a system for digital item management and randomization techniques in an online platform is provided. The system comprises one or more processors and one or more memories storing non-transitory computer executable instructions. The non-transitory computer executable instructions, when executed via the one or more processors, cause the one or more processors to: receive, during an online session on the online platform, an additional input layer for rendering on a display of each external user computing device that is connected to the online session, the online session including rendering a real-time video stream input from a host user computing device on the display of each external user computing device connected to the online session, layer the additional input layer with the real-time video stream input in an order defined by a host user operating the host user computing device, flatten the additional input layer and the real-time video stream input into a single layer video input stream, and cause the single layer video input stream to render on the display of each external user computing device during the online session.

In other embodiments, a computer-implemented method performed via one or more processors for digital item management and randomization techniques in an online platform is provided. The method comprises: receiving, during an online session on the online platform, an additional input layer for rendering on a display of each external user computing device that is connected to the online session, the online session including rendering a real-time video stream input from a host user computing device on the display of each external user computing device connected to the online session; layering the additional input layer with the video stream input in an order defined by a host user operating the host user computing device; flattening the additional input layer and the video stream input into a single layer video input stream; and causing the single layer video input stream to render on the display of each external user computing device during the online session.

In other embodiments, one or more computer readable media storing non-transitory computer executable instructions for digital item management and randomization techniques in an online platform are provided. The computer executable instructions, when executed via one or more processors of one or more servers, cause the one or more servers to: receive, during an online session on the online platform, an additional input layer for rendering on a display of each external user computing device that is connected to the online session, the online session including rendering a real-time video stream input from a host user computing device on the display of each external user computing device connected to the online session; layer the additional input layer with the video stream input in an order defined by a host user operating the host user computing device; flatten the additional input layer and the video stream input into a single layer video input stream; and cause the single layer video input stream to render on the display of each external user computing device during the online session.

In other embodiments, a system for digital item management and randomization techniques in an online platform is provided. The system comprises one or more processors and one or more memories storing non-transitory computer executable instructions. When executed via the one or more processors, the non-transitory computer executable instructions cause the one or more processors to: store, during an online session on the online platform, an association indication between an available product in the online session and an external user participating in the online session, receive an acceptance indication for an integrated grading option from the external user, after the online session has concluded, automatically generate a shipping label that causes the available product associated with the external user to be shipped to a grading provider prior to shipment to the external user, receive, from a grading provider device, a grading value corresponding to the available product, and store the grading value corresponding to the available product in a grading database that includes a storage location associated with prior grading values of the available product and prior sale values of the available product.

In other embodiments, a computer-implemented method performed via one or more processors for digital item management and randomization techniques in an online platform is provided. The method comprises: storing, during an online session on the online platform, an association indication between an available product in the online session and an external user participating in the online session; receiving an acceptance indication for an integrated grading option from the external user; after the online session has concluded, automatically generating a shipping label that causes the available product associated with the external user to be shipped to a grading provider prior to shipment to the external user; receiving, from a grading provider device, a grading value corresponding to the available product; and storing the grading value corresponding to the available product in a grading database that includes a storage location associated with prior grading values of the available product and prior sale values of the available product.

In other embodiments, one or more computer readable media storing non-transitory computer executable instructions for digital item management and randomization techniques in an online platform are provided. When executed via one or more processors of one or more servers, the non-transitory computer executable instructions cause the one or more servers to: store, during an online session on the online platform, an association indication between an available product in the online session and an external user participating in the online session; receive an acceptance indication for an integrated grading option from the external user; after the online session has concluded, automatically generate a shipping label that causes the available product associated with the external user to be shipped to a grading provider prior to shipment to the external user; receive, from a grading provider device, a grading value corresponding to the available product; and store the grading value corresponding to the available product in a grading database that includes a storage location associated with prior grading values of the available product and prior sale values of the available product.

In other embodiments, a system for digital item management and randomization techniques in an online platform is provided. The system comprises one or more processors and one or more memories storing non-transitory computer executable instructions. When executed via the one or more processors, the non-transitory computer executable instructions cause the one or more processors to: capture, by an imaging device, an image of an available product prior to an online session on the online platform, execute a machine vision algorithm on the image to extract metadata corresponding to the available product, store the metadata in a database with a storage location corresponding to the available product, during the online session, capture, by the imaging device, a subsequent image of the available product, execute the machine vision algorithm to determine that the product is represented in the subsequent image, and cause each external user computing device connected to the online session to display the metadata while the product is within a field of view of the imaging device.

In other embodiments, a computer-implemented method performed via one or more processors for digital item management and randomization techniques in an online platform is provided. The method comprises: capturing, by an imaging device, an image of an available product prior to an online session on the online platform; executing a machine vision algorithm on the image to extract metadata corresponding to the available product; storing the metadata in a database with a storage location corresponding to the available product; during the online session, capturing, by the imaging device, a subsequent image of the available product; executing the machine vision algorithm to determine that the product is represented in the subsequent image; and causing each external user computing device connected to the online session to display the metadata while the product is within a field of view of the imaging device.

In other embodiments, one or more computer readable media storing non-transitory computer executable instructions for digital item management and randomization techniques in an online platform are provided. When executed via one or more processors of one or more servers, the non-transitory computer executable instructions cause the one or more servers to: capture, by an imaging device, an image of an available product prior to an online session on the online platform; execute a machine vision algorithm on the image to extract metadata corresponding to the available product; store the metadata in a database with a storage location corresponding to the available product; during the online session, capture, by the imaging device, a subsequent image of the available product; execute the machine vision algorithm to determine that the product is represented in the subsequent image; and cause each external user computing device connected to the online session to display the metadata while the product is within a field of view of the imaging device.

In accordance with the above, and with the disclosure herein, the present disclosure includes improvements in computer functionality or in improvements to other technologies at least because the present disclosure describes that, e.g., online platforms/applications, and their related various components, may be improved or enhanced with the disclosed systems and methods that provide more efficient and robust services and functions for respective host users and guests. That is, the present disclosure describes improvements in the functioning of an online platform/application itself or "any other technology or technical field" (e.g., the field of online platforms for interactive electronic services) because the disclosed systems and methods improve and enhance operation of online platform/application at least by introducing: (i) a randomization algorithm and corresponding animated randomization graphical overlay, (ii) input layer flattening for additional input layers with the real-time video stream of the online session, (iii) an integrated grading option, and (iv) a machine vision algorithm to eliminate host user error and other inefficiencies typically experienced by online platforms/applications lacking such systems and methods. As a result, this improves the state of the art at least because such previous online platforms/applications are inefficient as they lack the capability to provide the various features and services enabled by the aspects introduced by the systems and methods of the present disclosure.

In addition, the present disclosure includes applying various features and functionality, as described herein, with, or by use of, a particular machine, e.g., user computing devices, mobile devices, imaging devices, and/or other hardware components as described herein.

Moreover, the present disclosure includes specific features other than what is well-understood, routine, conventional activity in the field, or adding unconventional steps that demonstrate, in various embodiments, particular useful applications, e.g., determine, by a randomization algorithm, a category member from a set of category members that is thereafter associated with a respective category placeholder for a duration of the online session; and cause the animated randomization graphical overlay to display an animated randomization sequence that selects the category member from the set of category members on the display of each external user computing device that is connected to the online session.

BRIEF DESCRIPTION OF THE FIGURES

FIG. 8A is a flow diagram of an example method performed via one or more servers for digital item management and randomization techniques in an online platform, in accordance with some embodiments.

FIG. 8B is a flow diagram of another example method performed via one or more servers for digital item management and randomization techniques in an online platform, in accordance with some embodiments.

FIG. 8C is a flow diagram of yet another example method performed via one or more servers for digital item management and randomization techniques in an online platform, in accordance with some embodiments.

DETAILED DESCRIPTION

Embodiments of the present disclosure relate to computing systems and methods that, broadly speaking, utilize a software application implemented at mobile electronic computing devices and/or other electronic computing devices, the application facilitating auctions and/or direct purchases of collectible items such as trading cards, card packs, toys, figurines, comic books, manga, vintage video games, clothing, etc.

More specifically, the present disclosure includes a suite of services and features available to a host user as part of a mobile application that accesses an online platform to conduct online sessions. These services and features generally include a randomization algorithm and corresponding animated randomization graphical overlay, input layer flattening for additional input layers with the real-time video stream of the online session, an integrated grading option to automatically and seamlessly connect host users and guests to graders, and a machine vision algorithm configured to extract metadata from images of available products featured as part of an online session. As a result of these services and features, and combinations thereof, the systems and methods of the present disclosure overcome the issues experienced by conventional online platforms. Further, these services and features will be understood from the present disclosure in reference to example systems diagrams, signal diagrams, GUIs, and block diagrams.

Example Computing Environment

Figure 1:
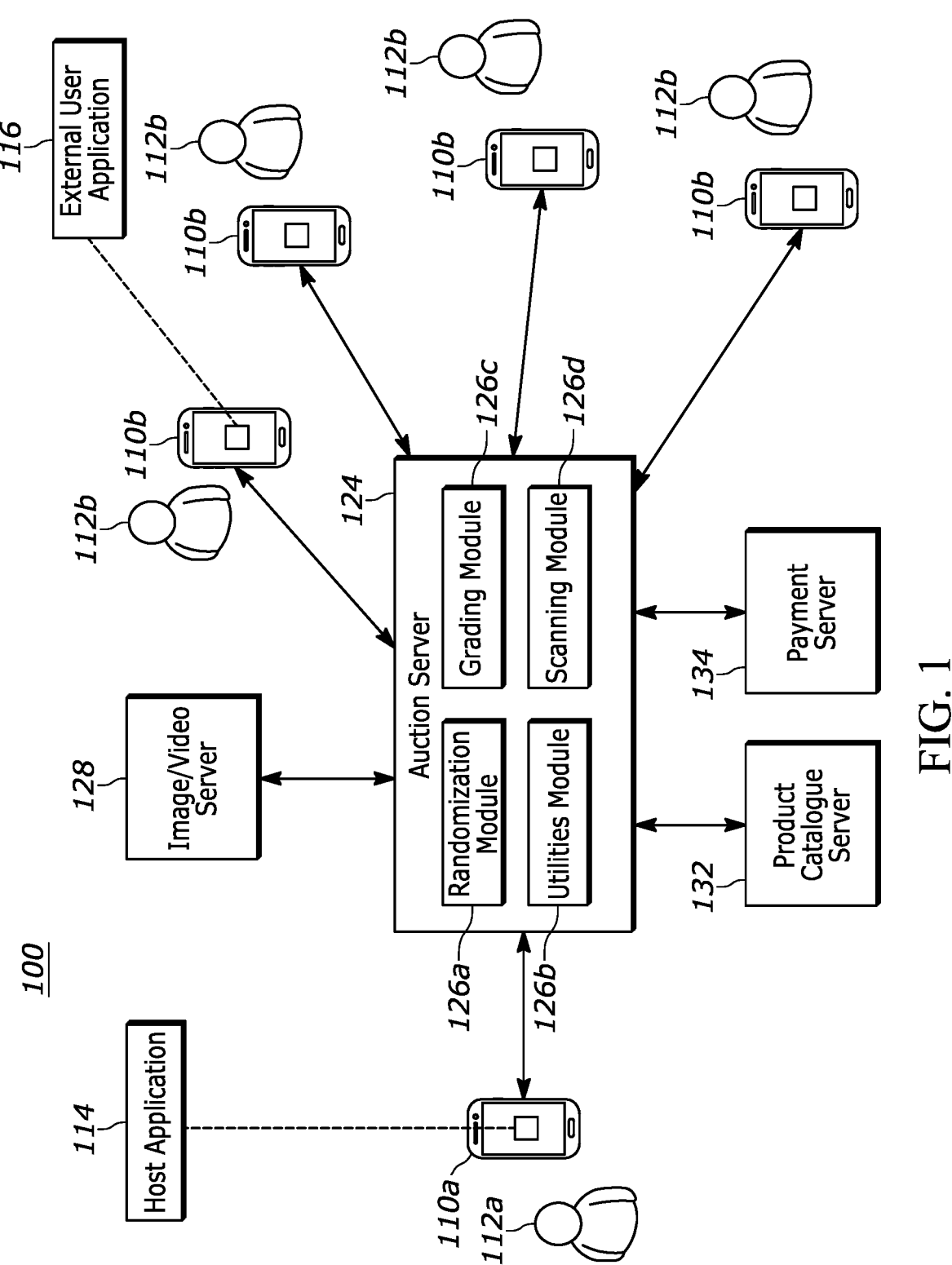
FIG. 1 is a block diagram of an example computing environment, in accordance with some embodiments of the present description.

FIG. 1 illustrates a block diagram of an example computing environment 100 via which techniques of the present description may be implemented. In particular, elements of the computing environment 100 may provide the services and features described herein (e.g., with respect to online auctions). Although various components of the example computing environment 100 will be described below, it should be understood that additional, fewer, and/or alternate components may be envisioned in various embodiments, without necessarily deviating from the techniques described herein.

The computing environment includes a first mobile computing device 110a associated with a first user 112a, and a plurality of second mobile computing devices 110b associated with respective ones of a plurality of second users 112b. Mobile computing devices 110a and 110b may include, for example, smartphones, smart tablets, smart wearable devices, other suitable mobile devices, or some combination thereof. Although mobile computing devices 110a and 110b are discussed herein, it should be understood that the mobile computing devices 110a and 110b may, in some embodiments, be substituted for desktop computers and/or other non-mobile devices.

In the example environment 100, the first user 112a represents a seller or host user, e.g., a person or entity making one or more items for auction utilizing the services and features of the present disclosure. Accordingly, the first mobile computing device 110a is generally referred to herein as a host device 110a. The second users 112b in this example represent prospective buyers (or simply "buyers" or "external users") who may access the host's live stream to interact with other external users during the online auction as well as to bid on and/or purchase items via the online auction, etc. Accordingly, the mobile computing devices 110b are referred to herein external user devices 110b.

Each of the mobile computing devices 110a and 110b may respectively comprise one or more computer processors and one or more non-transitory computer memories storing instructions that, when executed via the one or more processors, cause the device 110a or 110b to perform the actions attributed to the device 110a or 110b in the present disclosure. In the case of the host device 110a, the one or more non-transitory memories may store one or more software applications 114 ("host application") including one or more sets of non-transitory computer executable instructions that, when executed via the one or more processors, cause the host device 110a to perform actions described herein. Similarly, the one or more memories of each external user device 110b may store one or more software applications 116 ("external user application") including one or more sets of non-transitory computer executable instructions that, when executed via the one or more processors of the external user device 110b, cause the external user device 110b to perform actions described herein. Although host application 114 and external user application 116 are illustrated as separate blocks in FIG. 1, it should be understood that applications 114 and 116 may represent separate aspects of the same one or more applications (e.g., a single application stored and executed both at devices 110a and 110b, and each user 112a or 112b may alternatively operate as a host or external user using the single application). Each of the host device 110a and external user devices 110b may comprise one or more application programming interfaces (APIs) operable for example to (1) generate and display GUIs, (2) capture or otherwise obtain still images and/or videos, (3) display images, videos, item information, and/or other information described herein, (4) communicate with one or more servers (e.g., to receive real-time item information and/or communicate bids or purchases placed via the each device), and/or perform other actions described herein.

The host device 110a (and, in some instances, the external user devices 110b) may comprise one or more camera devices (also referenced herein as an "imaging device"), which may for example capture still images and/or video content to be included as part of an online auction of the host user 112a, or capture a real-time video stream for a live auction event. Additionally, in some embodiments, the host device 110a (and in some instances, the external user devices 110b) includes one or more microphones and/or speaker, which may capture, transmit, and/or play audio (e.g., accompanying audio in a video, such as a real-time video stream of an online auction). The one or more camera devices, microphones, and/or speakers may include integrated devices (e.g., a camera, microphone, or speaker natively included in a mobile computing device) and/or devices otherwise communicatively tethered to the host device 110a or external user device 110b (e.g., a peripheral webcam, speaker, or microphone connected wiredly or wirelessly to the mobile computing device). Additionally, each of the host device 110a and external user devices 110b may include one or more interactive I/O units (e.g., touchscreens, touchpads, keyboard, etc.) enabling navigation of graphical user interfaces, viewing of images and/or videos in the context of a real-time video stream, and/or interactive functionalities described herein.

An auction server 124 (i.e., one or more servers) may generally host an online platform that facilitates/enables communications among devices 110a and 110b, and may store information and/or implement various features and services associated with the online auction features and services described herein. For example, the auction server 124 may store and distribute information relating to items, implement logic relating to auctions and/or direct purchases of items via stories, and/or provide access to features and services that may be implemented by the host device 110a (or, in some instances, the external user devices 110b). The auction server 124 may include one or more processors and one or more non-transitory computer readable memories storing instructions that, when executed via the one or more processors, cause the auction server 124 to perform the actions described herein. In particular, the one or more non-transitory memories of the auction server 124 may include a randomization module 126a, a utilities module 126b, a grading module 126c, and a scanning module 126d.

The randomization module 126a may generally store or comprise instructions corresponding to randomization of category assignments during an online session. The randomization module 126a may include instructions corresponding to rendering an animated randomization graphical overlay on a display of each external user device 110b that is connected to the online session, as described herein. The randomization module 126a may further include a randomization algorithm and instructions corresponding to determining a category member from a set of category members by executing the randomization algorithm. When the auction server 124 processors execute the randomization algorithm and determine category members for respective external users 112b, the auction server 124 (or the host device 110a) may store an association between the respective external users 112b and the category members for a duration of the online session. More specifically, the randomization module 126a may include instructions that cause the auction server 124 to store an association between a category placeholder purchased and/or otherwise assigned to a respective external user 112b and the category member determined for the respective external user 112b as a result of executing the randomization algorithm.

Moreover, the randomization module 126a may include instructions that cause the external user devices 110b to display an animated randomization graphical overlay, and thereby display an animated randomization sequence that selects the category member from the set of category members on the display of each external user device 110b. The animated randomization graphical overlay may generally be or include a spinning wheel and/or any other suitable graphical overlay that moves (e.g., rotates) and/or otherwise animates in a manner that simulates a selection of the category member that has been randomly determined for the external user 112b.

The utilities module 126b may generally store or comprise instructions corresponding to a variety of features the host user 112a may utilize or implement during an online session that enhance or otherwise improve the real-time video stream or captured images/video. In particular, the utilities module 126b may include instructions corresponding to receiving and layering additional input layers for rendering on a display of each external user device 110b during the online session. For example, these additional input layers may be or include an additional text layer, an additional video stream input (e.g., a face camera video stream), a video filter, an animation sequence, a visual graphic, and/or any other suitable audio/visual input layer or combinations thereof. The utilities module 126b may further include instructions corresponding to layering the additional input layer with the real-time video stream input in an order defined by the host user 112a operating the host device 110a. For example, the host user 112a may desire to place a face cam video stream over the real-time video stream, so that the external users 112b may see the host user 110a during the online session.

Moreover, the utilities module 126b may further include instructions corresponding to flattening the additional input layers and the real-time video stream input into a single layer video input stream. This flattening may be performed by the auction server 124 in accordance with instructions included as part of the utilities module 126b and/or the auction server 124 may transmit the additional input layers and the real-time video stream input to an external processing location (e.g., the image/video server 128) to perform the layer flattening. In any event, the utilities module 126b may also include instructions corresponding to causing the single layer video input stream to render on the display of each external user device 110b during the online session.

The grading module 126c may generally store or comprise instructions corresponding to an integrated grading service the external users 112b may choose to utilize when an external user 112b purchases an available product as part of the online session, and that the auction server 124 may utilize to compile/provide additional information regarding host users 112a. In particular, the grading module 126c may include instructions corresponding to storing association indications between available products in the online session and external users 112b, and the association indications may indicate that a respective external user 112b purchased the available product during the online session. External users 112b may also input acceptance indications for an integrated grading option, and the grading module 126c may include instructions corresponding to automatically generating a shipping label that causes the available product associated with the external user 112b to be shipped to a grading provider (not shown) prior to shipment to the external user 112b.

The grading module 126c may additionally include instructions to receive, from a grading provider device, a grading value corresponding to the available product. For example, the host user 112a may ship the available product to the grading provider after the online session, and the grading provider may provide a grading value for the available product through a connected device, such that the grading value reaches the auction server 124. The grading module 126c may further include instructions that cause the auction server 124 to store the grading value corresponding to the available product in a grading database (not shown) that may be included as part of the grading module 126c. The grading database may generally include a storage location associated with prior grading values of the available product and prior sale values of the available product. As a result, the auction server 124 may calculate aggregate grading values for products sold by the host user 112a, and may display these aggregate grading values or the individual grading values on external user devices 110b for external users 112b during subsequent online sessions.

In some embodiments, the grading module 126c includes a machine learning (ML) model that may be trained to output a preliminary grading value for an available product. Machine learning as applied to the ML model of the grading module 126c may involve identifying and recognizing patterns in existing data, such as a plurality of training data that includes training image data of available products and training grading value corresponding to the training image data, in order to facilitate making predictions or identification for subsequent data (such as predicting a preliminary grading value corresponding to available products). For example, a machine learning model, such as the ML model of the grading module 126c, as described herein, may be created and trained based upon training data (e.g., data or information regarding image data of available products and grading values corresponding to the available products represented in the image data, or other information or data described herein) as inputs or data (which may be termed "features" and "labels") in order to make valid and reliable predictions for new inputs, such as testing level or production level data or inputs (e.g., for predicting a preliminary grading value corresponding to available products).

Generally speaking, in supervised machine learning, a machine learning program operating on a server, computing device, or otherwise processors, may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on a server, computing device, or otherwise processors as described herein, to predict or classify, based on the discovered rules, relationships, or model, an expected output, score, or value.

In unsupervised machine learning, the server, computing device, or otherwise processors, may be required to find its own structure in unlabeled example inputs, where, for example multiple training iterations are executed by the server, computing device, or otherwise processors to train multiple generations of models until a satisfactory model, e.g., a model that provides sufficient prediction accuracy when given test level or production level data or inputs, is generated.

In reinforcement machine learning, a machine learning program operating on a server, computing device, or otherwise processors, is tasked with performing actions (e.g., predicting preliminary grading values corresponding to available products) in an environment in order to maximize a cumulative "reward". Reinforcement learning does not require labelled input/output pairs be presented, and similarly does not rely upon explicit corrections to sub-optimal actions. Instead, reinforcement learning primarily focuses on determining a balance between exploration of unknown relationships and exploitation of known relationships. Many reinforcement learning algorithms also use dynamic programming techniques, and the environment is typically stated in the form of a Markov decision process (MDP).

Reinforcement learning, supervised learning, and/or unsupervised machine learning may also comprise retraining, relearning, or otherwise updating models with new, or different, information, which may include information received, ingested, generated, or otherwise used over time. The disclosures herein may use one or more of such reinforcement, supervised, or unsupervised machine learning techniques. Moreover, it is to be understood that the ML model of the grading module 126c may be used to determine predictions of preliminary grading values corresponding to available products, using artificial intelligence (e.g., a ML model of grading module 126c) or, in alternative aspects, without using artificial intelligence.

In certain embodiments, the ML model of the grading module 126c may be trained to output a preliminary grading value corresponding to the available products. Further in these embodiments, the host device 110a may capture, by an imaging device, an image of the available product that includes a plurality of image data representative of the available product. The host device 110a and/or the auction server 124 may then apply the ML model to the plurality of image data to output a preliminary grading value corresponding to the available product.

Moreover, the plurality of training data used to train the ML model of the grading module 126c may include a plurality of training price values of the available products, and the ML model may further be configured to output a preliminary price value corresponding to the available products. In these embodiments, the host device 110a and/or the auction server 124 may apply the ML model to the plurality of image data to output the preliminary grading value and a preliminary price value corresponding to the available product. In some instances, these embodiments may include rendering, at a display of an external user computing device 110b of an external user 112b, the preliminary grading value. Upon receiving an interaction with the preliminary grading value from the external user 112b, the external user computing devices 110b may further include displaying at least a portion of the plurality of image data with a preliminary grading value indication. Additionally, or alternatively, the host device 110a and/or the auction server 124 may re-train the ML model based on the grading value received from the grading provider device and the preliminary grading value.

The scanning module 126d may generally store or comprise instructions corresponding to an automated metadata extraction/presentation service that host users 112a may utilize to quickly upload available product data for display and searching by external users 112b. In particular, the scanning module 126d may include instructions corresponding to capturing, by an imaging device (e.g., an integrated imaging device (not shown) of host device 110a), an image of an available product. The scanning module 126d may instruct the host device 110a to capture the image before or during the online session, such that the scanning module 126d may also instruct the auction server 124 or host device 110a to execute a machine vision algorithm on the image that extracts metadata corresponding to the available product. For example, the machine vision algorithm may be or include an optical character recognition (OCR) algorithm that detects and extracts text and/or other characters present on the available product represented in the captured image data. Further, the auction server 124 and/or host device 110a may execute the machine vision algorithm on images captured by the host user 112a prior to the online session or on images comprising the real-time video stream during the online session.

Regardless, the scanning module 126d may further include instructions corresponding to storing the extracted metadata in a database (e.g., included as part of the scanning module 126d) with a storage location corresponding to the available product. The scanning module 126d may also include instructions to capture, by the imaging device, a subsequent image of the available product during the online session, and to execute the machine vision algorithm to determine that the product is represented in the subsequent image. The scanning module 126d may then instruct the auction server 124 and/or the host device 110a to cause each external user device 110b to display the metadata while the product is within a field of view of the imaging device.

In some embodiments, the scanning module 126d may also include a machine learning (ML) model that is trained to output an available product identification value and a preliminary price value for an available product prior to and/or during an auction for the available product during an online session. The available product identification value may correspond to a predicted identity and/or otherwise identifying information corresponding to the available product, and the preliminary price value may correspond to a predicted price of the available product. Training the machine learning model of the scanning module 126d may include training the ML model with a plurality of training data that includes training image data of available products and training price values corresponding to the training image data. The ML model may be trained to output a training available product identification value and a training preliminary price value corresponding to the available products. Further in these embodiments, the host device 110a and/or the auction server 124 may apply the ML model to an image or a subsequent image of an available product to output an available product identification value (e.g., player X sports card, character Y trading card, etc.) and a preliminary price value (e.g., $5, $10, $100, or any suitable estimated price) corresponding to the available product. Of course, in certain instances, the ML model may be trained to output an available product identification value or a preliminary price value.

In certain instances, the host device 110a may also include executable instructions (e.g., any of modules 126a-126d) configured to analyze captured image/video data and/or the real-time video stream to extract metadata from that data, provide the integrated grading service and/or other features (e.g., layering additional input layers, randomizing category assignments). Further, the host device 110a and/or the external user devices 110b may download and/or otherwise access the executable instruction modules 126a-126d stored on the auction server 124 for execution at the host device 110 and/or the external user devices 110b.

The auction server 124 may communicate with still additional servers to facilitate other functions described herein. For example, an image/video server 128 may facilitate operations of the auction server 124 by storing images/videos and/or metadata associated with the images/video captured by a host user 112a, and/or additional images/videos associated with items (e.g. □ stored images/videos that the host user 112a may elect to use in a story or other posting, rather than taking their own images/videos at device 110a). Additionally, or alternatively, a product catalogue server 132 may store a listing of known products/items, from among which host users 112a may designate products to be listed in their respective product inventories and to be included for auction. Still additionally or alternatively, a payment server 134 may store and process payment information relating to host users 112a and/or external users 112b. Although each of the auction server 124, image/video server 128, product catalogue server 132, and payment server 134 are described in singular herein, it should be understood that each of the servers 124, 128, 132, and 134 may respectively comprise one or more server devices, with functions thereof being distributed among the one or more servers.

Arrows in FIG. 1 represent signal communications exchanged among the elements of the computing environment 100. Elements of the computing environment 100 may communicate via any suitable one or more communications networks (e.g., the Internet, a wired or wireless local area network (LAN), etc.). Elements of the computing environment 100 may communicate of via any suitable one or more communication protocols, including for example a mobile cellular communications protocol (e.g., CDMA, GSM, EV-DO, LTE, IP, etc.), one or more IEEE 802.11 protocols (e.g., Wi-Fi), Bluetooth, and/or other suitable protocols in accordance with the computing capabilities of respective elements of the computing environment 100.

Generally, each of the image/video server 128, the product catalogue server 132, and the payment servers 134 may respectively comprise one or more processors and one or more non-transitory memories storing computer executable instructions that, when executed by the one or more processors, cause the server(s) to perform actions described herein. Although arrows in FIG. 1 connect the mobile computing devices 110a and 110b to the servers 128, 132, and 134 by way of the one or more auction servers 124, it should be noted that in some embodiments, the server(s) 128, 132, and/or 134 may exchange communications directly with the mobile computing devices 110a and 110b. Furthermore, although the servers 124, 128, 132, and 134 are illustrated in FIG. 1 as separate elements, it should be understood that functions of the servers 124, 128, 132 and 134 may be combined in various manners, in some embodiments. For example, in some embodiments, the auction server 124 is configured to also perform at least some of the functions of the image/video server 128, the product catalogue server 132, and/or the payment server 134.

Subsequent portions of the present description, with reference to FIGS. 2, 3A-3D, 4A-4B, 5A-5E, 6A-6C, 7, and 8A-8D, provide examples of signal communications, GUIs, and computer-implemented methods associated with implementation of the various services and features described herein. In various embodiments, described communications, GUIs, actions, etc. may be implemented by suitable components of the computing environment 100 described above. In instances where example processes are described with reference to signal diagrams, it should be understood that the example processes may include additional, fewer, and/or alternate actions, in various embodiments. Furthermore, order actions of the described processes may vary from the order illustrated in the signal diagrams. Where interactive GUIs at a mobile computing device are described, interactions with the interactive GUIs may occur, for example, via touchscreen interactions, voice commands, and/or other suitable forms of user input.

Figure 2:
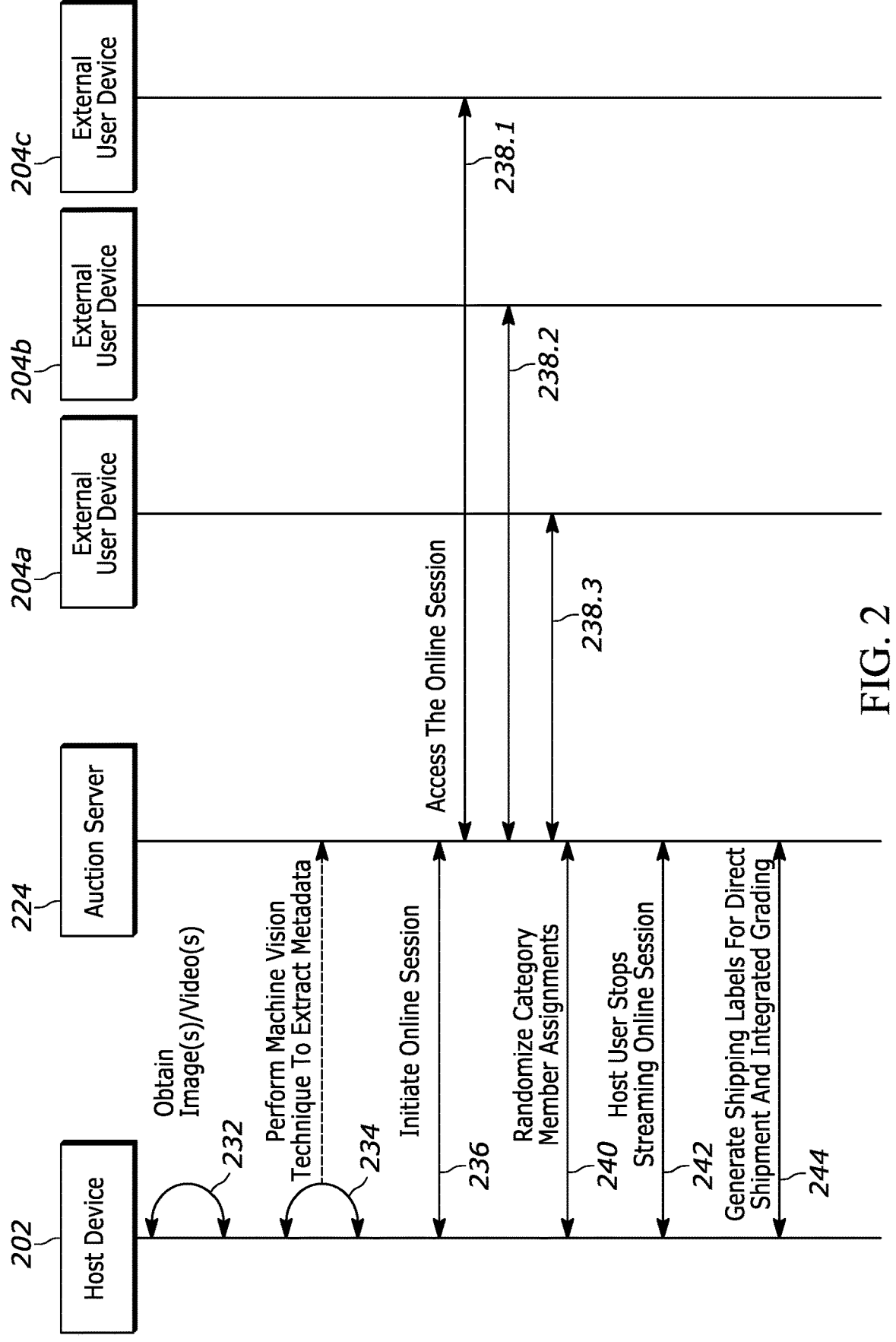
FIG. 2 is a signal diagram detailing example actions associated with digital item management and randomization techniques in an online platform including one or more images/videos associated with one or more available products, in accordance with some embodiments.

Example Process of Digital Item Management and Randomization During an Online Session FIG. 2 illustrates a signal diagram of example processes/actions associated with digital item management and randomization techniques in an online platform including one or more still images and/or videos associated with a sale (e.g., auction) of one or more items. The process as depicted in FIG. 2 may include communications among an auction server 224 (e.g., the auction server 124 of FIG. 1), a host device 202 (e.g., host device 110a of host user 110a executing the host application 114), and external user devices 204a, 204b, and 204c (e.g., respective external user devices 110b of respective external users 112b executing the external user application 116). Although the server 224 is referred to herein as the "auction server," it should be understood that the auction server 224 as described herein may additionally/alternatively implement functionalities of other servers of the present description, where appropriate. For example, in some embodiments, the auction server 224 may implement functionalities of the image/video server 128, the product catalogue server 132, and/or the payment server 134 of FIG. 1.

It should be noted that the description of the process of FIG. 2 will be described at a very high level, to provide a general overview of concepts to be described in still further detail in the present description. Description of FIG. 2 will offer examples of some embodiments, and these and other embodiments will be described in still further detail with respect to subsequent figures, which include representations of example graphical user interfaces (GUIs) via which actions of the example process of FIG. 2 may be implemented. Moreover, additional actions may be added to the process of FIG. 2, including any suitable actions described in the present description, in various embodiments.

The process as illustrated in FIG. 2 begins with the host device 202 obtaining one or more still images and/or videos (232) that are to be included in an online session by a host user (i.e., the person or entity using the host device 202). In embodiments, the one or more images and/or videos may include at least one image or videos captured via a camera unit of the host device 202 (e.g., via a camera functionality in the host application, or via another camera application of the host device 202). Additionally, or alternatively, though, the one or more images and/or videos can include locally-stored images/videos obtained by the host device 202 via other means (e.g. an image or video previously downloaded to the host device 202 from the Internet, or received via USB data transfer, AirDrop®, etc.). Still additionally or alternatively, the one or more images and/or videos may include one or more images or videos from the auction server 224 (that is, the host device 202 may "look up" and select images/videos stored by the server 224, e.g., images/videos associated with an item that is to be auctioned or otherwise offered for purchase). In any case, the process as illustrated in FIG. 2 may continue with the host device 202 (e.g., the host user) performing a machine vision technique (e.g., OCR) on the images or videos to extract metadata corresponding to the available product(s) represented in the images or videos (234). In embodiments in which the one or more images/videos are obtained at action 232 using the host application, extracting the metadata from the images and/or videos via a machine vision technique at action 234 may coincide at least in part with action 232. Functionalities associated with capturing images and/or videos of available products and extracting metadata from those images/videos to be included in an online session will be discussed further in subsequent portions of the present disclosure, particularly with respect to example GUIs illustrated in FIGS. 3A-3C.

The process of FIG. 2 further includes initiating an online session (e.g., a live online auction) on the online platform hosted by the auction server 224 (236). Initiating the online session may generally include activating a real-time video stream that is published (or "posted") to and/or otherwise broadcast from the auction server 224 (or directly through the host user device 202). Publishing and/or otherwise broadcasting the online session through the auction server 224 causes the online session to be discoverable and watchable at each of the external user devices 204a, 204b, and 204c (e.g., via the external user application 116 executing at devices 204a, 204b, and 204c) via communication with the auction server 224. The online session may be accessible via the auction server 224 for a limited duration of time (e.g., one hour, two hours, four hours, eight hours, twelve hours, 48 hours, etc.) while the host user continues to stream the real-time video to conduct the live online auction or other actions. In some embodiments, the auction server 224 automatically notifies one or more of the external user devices 204a-204c of the new online session being streamed by the host user, e.g., when an external user of one of the external user devices 204a-204c has "followed" the host user or followed a category relevant to the host user.

In any event, the external user devices 204a, 204b, and 204c may access the online session (238.1, 238.2, 238.3) while the stream is live (i.e., within the limited duration of time while the host user continues to stream the real-time video). Accessing the online session at an external user device 204a-204c, generally speaking, includes displaying the one or more images/videos (or at least a portion thereof) at the external user device 204a-204c in conjunction with real-time information associated with the sale of the one or more available products (e.g., metadata extracted from images/videos of available products). In particular, accessing the online session may include displaying real-time auction information (e.g., the most recent bid price for the item, time remaining in the auction), and/or placing a bid in the auction. Similarly, if the online session includes an offer for direct purchase of an available product, accessing the online session may include displaying real-time purchase information (e.g., price, quantity remaining, etc.), and/or communicating with the auction server 224 to purchase the available product. While the online session remains live, the auction server 224 may maintain real-time information associated with the auction or offer for direct purchase of the available product, such that each external user device 204a-204c accessing the online session pulls real-time auction or purchase information from the auction server 224 associated with the available product(s).

Moreover, as part of the process of FIG. 2 and during the online session, the host user may access and implement various user utilities to enhance and/or otherwise improve the quality of the online session for external users (e.g., accessing the online session via external user devices 204a-204c). Namely, the host user may access and implement a randomization algorithm to randomly assign category members to external users participating in the online session (240). For example, the host user may stream an online session that includes an auction for individual cards from a pack of sports cards. The host user may structure the auction such that external users participating in the auction purchase category placeholders prior to category assignments, and category members (e.g., individual/multiple teams, individual/multiple league divisions, positions, etc.) are thereafter assigned randomly. In these instances, the host user may access a randomization module (e.g., randomization module 216a) to perform the random assignment of category members to external users that purchased category placeholders. As part of this random assignment, the randomization module may cause each of the external user devices

204a-204c to render an animated randomization graphic overlay that graphically simulates the random selection of category members for each external user that purchased a category placeholder. Functionalities associated with category assignment randomization and corresponding techniques will be discussed further in subsequent portions of the present disclosure, particularly with respect to example GUIs illustrated in FIGS. 4A-4D.

The host user may also desire to incorporate additional utilities as part of their online session, such as inputting additional video layers for display with the real-time video stream. For example, the host user may access a utilities module (e.g., utilities module 126b) to input additional text layer, an additional video stream input, a video filter, an animation sequence, a visual graphic, and/or any other suitable input layer or combinations thereof for display with the real-time video stream. Functionalities associated with additional input layers will be discussed further in subsequent portions of the present disclosure, particularly with respect to example GUIs illustrated in FIGS. 5A and 5B.

After the host user stops streaming the real-time video, the online session stops being accessible at the auction server 224 (242), and thus the online session is no longer viewable publicly at the external user devices 204a-204c. In embodiments, the auction server 224 may continue to store all or some portion(s) of the online session and make those portions visible to the host device 202, within a dedicated online session archive available to the host user. In some embodiments, the conclusion of the online session coincides with the conclusion of the auction, and accordingly, the auction server 224 may execute additional logic associated with concluding the auction (e.g., identifying the highest bid and bidder for the available product, notifying a buyer device of the highest bidder for the available product, facilitating shipment of the available product and/or payment for the available product based upon stored profile information of the highest bidder, etc.). The auction server 224 may also determine which external users selected an integrated grading option to further determine shipping labels to ship the available products to a grading provider prior to shipping the available product to the external user (244). Functionalities associated with integrated grading and automatic generation of shipping labels will be discussed further in subsequent portions of the present disclosure, particularly with respect to example GUIs illustrated in FIGS. 6A-6E.

Although the process of FIG. 2 outlines one online session from a host user for the sake of simplicity, it should be appreciated that, in embodiments, a host user may conduct an online session in any suitable manner. For example, the host user may auction multiple available products from multiple different categories (e.g., playing cards, toys, video games, etc.) during a single online session. As a result, the host user may determine category member assignments multiple times, apply various effects during different portions of the online session, and/or any other suitable action(s) to introduce variety into a single (or multiple) online session.

Subsequent sections of the present description include description of example GUIs illustrated in FIGS. 3A-3C, 4A-4D, 5A, 5B, and 6A-6E. Generally speaking, the GUIs may be implemented at one or more electronic computing devices (e.g., mobile computing devices 110a, 110b, 202, 204a-204c, etc.), executing non-transitory computer executable instructions, which instructions may be part of a mobile software application as described in the present description (e.g., the host application 114 and/or external user application 116 of FIG. 1), and which may cause the one or more electronic computing devices to communicate with one or more servers (e.g., servers 128, 132, 134, 136, and/or 224). User interaction with the GUIs of the subsequent figures may be performed, for example, via touchscreen interactions, voice interactions, and/or other suitable input/output methods.

Extracting Metadata from Captured Images/Video

Figure 3A:
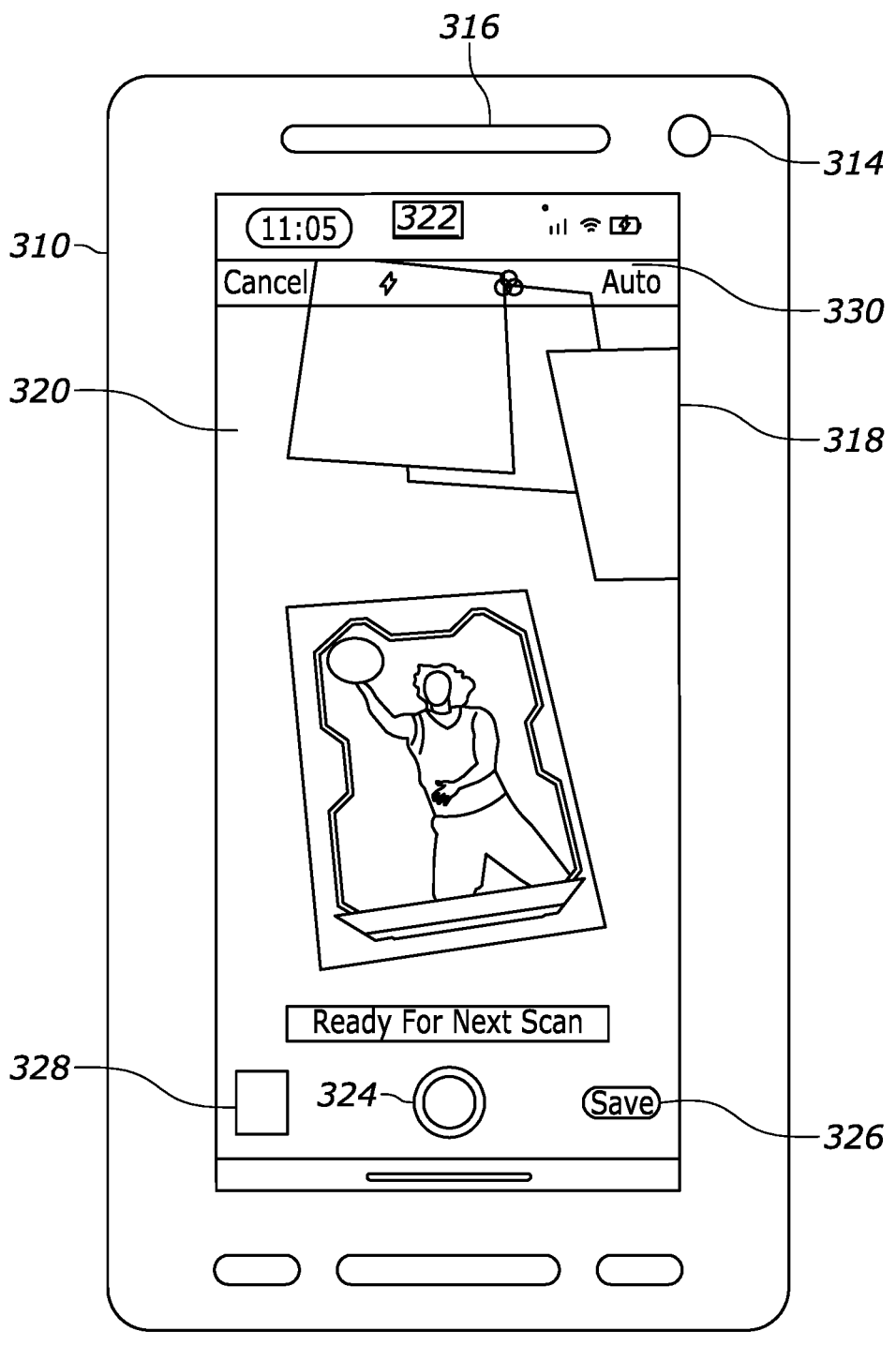
FIG. 3A is an example representation of a product scanning GUI executing on a mobile computing device, in accordance with some embodiments.
Figure 3B:
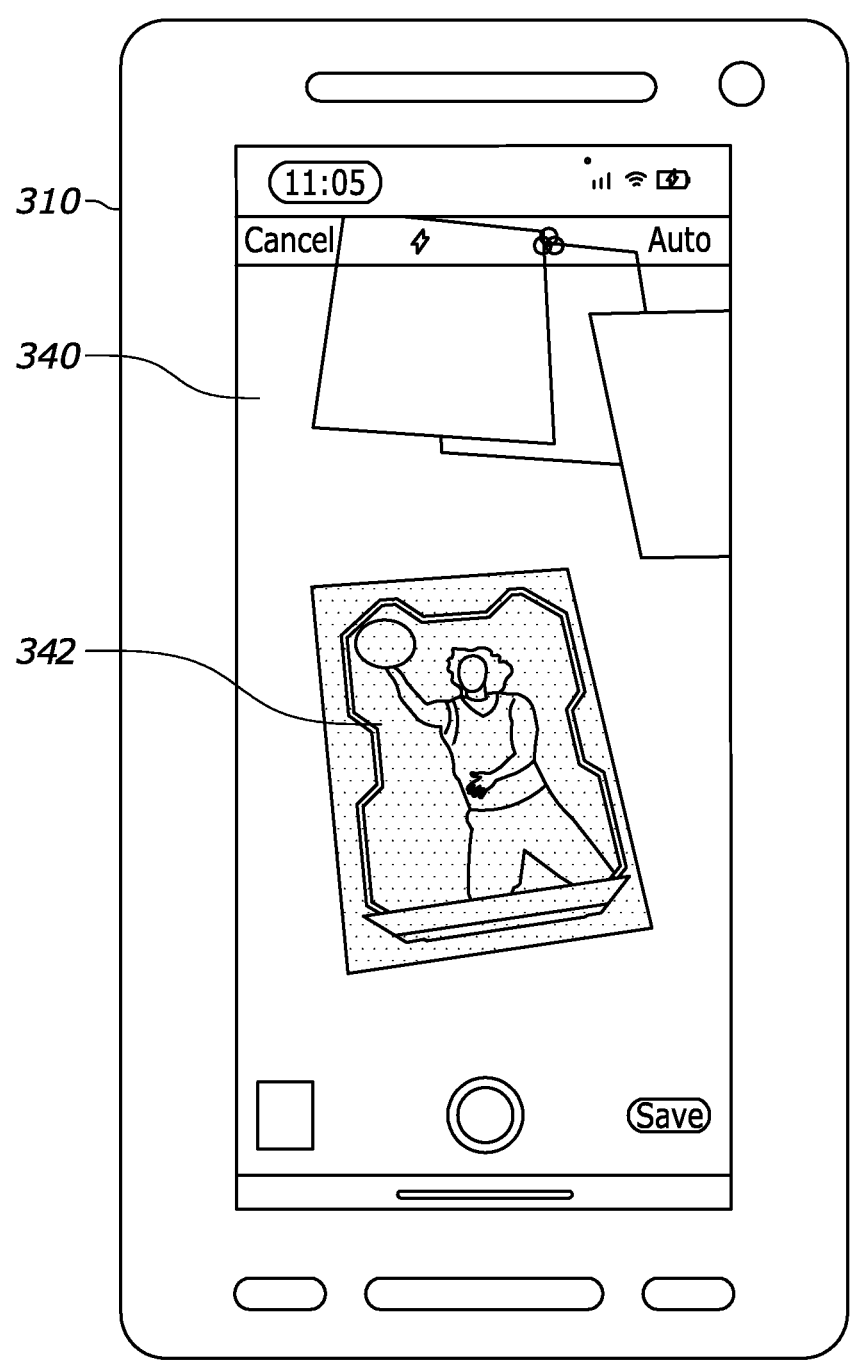
FIG. 3B is an example representation of a product scanning GUI including an identified available product portion executing on a mobile computing device, in accordance with some embodiments.
Figure 3C:
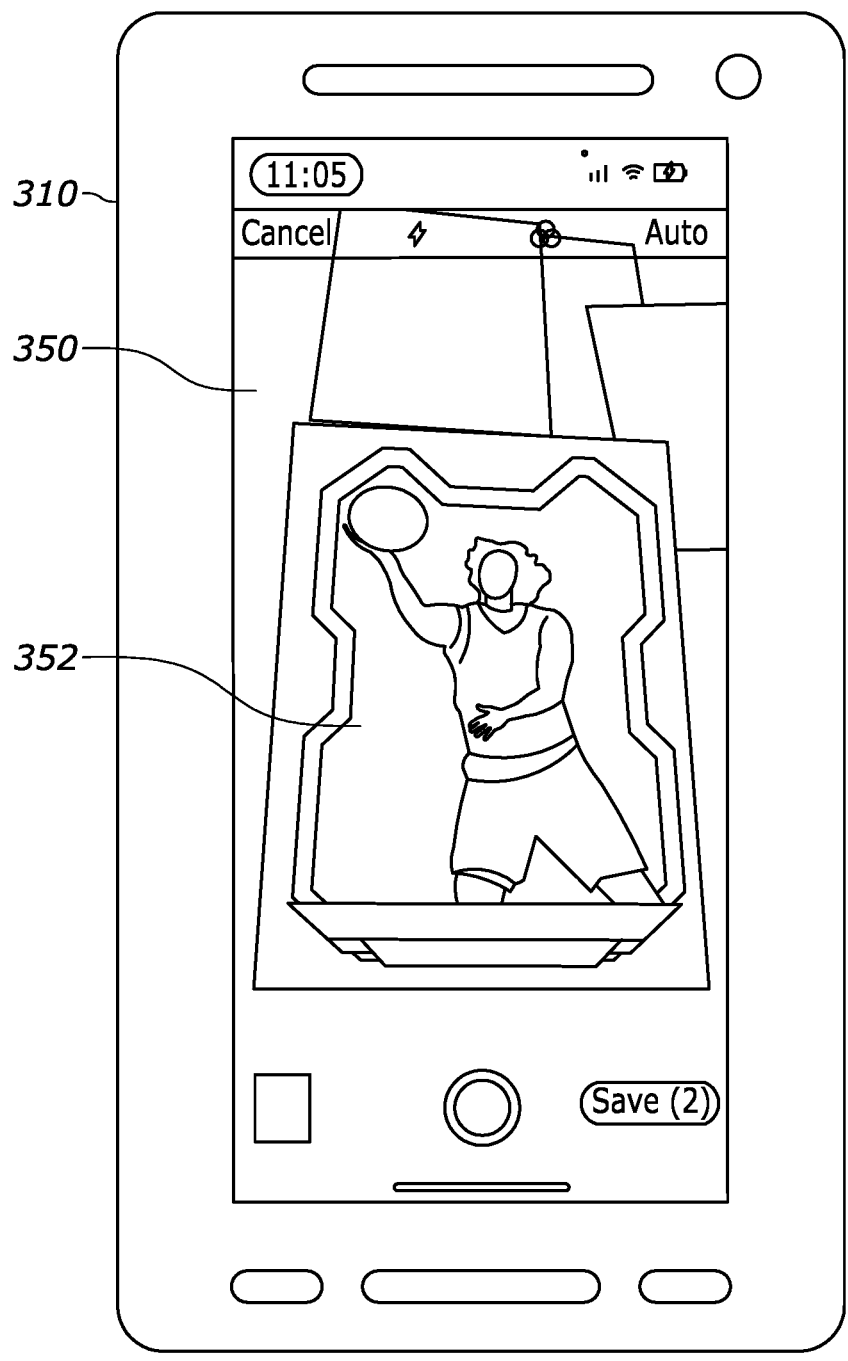
FIG. 3C is an example representation of a product scanning GUI including an extracted image of an available product executing on a mobile computing device, in accordance with some embodiments.

FIGS. 3A-3C illustrate a series of example GUIs associated with a metadata extraction process from videos and/or images associated with one or more available products for auction and/or for direct purchase during an online session. The GUIs of FIGS. 3A-3C are executed at a host device 310, which may correspond for example to the host device 202 of FIG. 2, the host device 110a of FIG. 1, and/or another suitable device. The host device 310 includes a camera 314 (i.e., at least one camera, e.g., a front-facing camera and/or a rear-facing camera), a microphone 316 (i.e., at least one microphone), and a visual display 318 (e.g., touchscreen) that displays the GUIs that will be described with respect to FIGS. 3A-3C. The GUIs described with respect to FIGS. 3A-3C may be implemented, for example, via the host device executing the host application 114 of FIG. 1, which may be in communication with the auction server 124 of FIG. 1, auction server 224 of FIG. 2, and/or other servers described herein.

Generally speaking, the GUIs described with respect to FIGS. 3A-3C may represent a series of actions performed on a live audio/video data stream or a captured image frame from the camera 314 that is displayed on the visual display 318. The live data stream and/or captured image frame(s) may be analyzed in accordance with instructions stored as part of a scanning module (e.g., scanning module 126d) stored locally on the host device 310 and/or stored remotely on the auction server 124 while displayed on the visual display 318. The scanning module 126d may generally include instructions corresponding to a machine vision technique, such as optical character recognition (OCR), that is configured to extract metadata from objects represented in the live data stream and/or captured image frame(s). As mentioned, each frame of the live data stream and/or the captured image frame(s) is associated with an available product for auction and/or direct purchase during an online session. Thus, when the host device 310 and/or the auction server 124 executes the instructions stored as part of the scanning module 126d to analyze the captured frames, the host device 310 and/or the auction server 124 may extract metadata corresponding to the available products. This extracted metadata can then be stored locally and/or remotely, and the host device 310 or the auction server 124 may display all or a portion of the extracted metadata during the online session.

In particular, FIG. 3A is an example representation of a product scanning GUI 320 executing on a mobile computing device (e.g., host device 310), in accordance with some embodiments. The product scanning GUI 320 may generally represent a field of view of the integrated camera 314 of the host device 310 prior to and/or during an online session, and the product scanning GUI 320 may be the first GUI of the metadata extraction process represented by FIGS. 3A-3C. An overlay 322 is presented over the top of the camera 314 field of view, and the overlay 322 may provide interactive options 324, 326, 328, and 330 respectively for capturing a new image (324), saving the new image to a storage location (326), viewing captured images (328), and adjusting and/or otherwise modifying image capture parameters of the camera 314 (330). In an example interaction, the user of the host device 310 (e.g., the host user) may select the capture new image option 324 to trigger the camera 314 to capture a new image frame of the field of view of the camera 314. As part of this example interaction, the user may determine that the newly captured image is not bright enough, and/or the host device 310 may inform the user accordingly, such that the user may interact with the image capture parameters option 330 to adjust the illumination provided during subsequent image captures (e.g., a flash function of the camera 314 may activate during subsequent image captures).

The host device 310 may then proceed to analyze the captured image and/or video stream to identify an available product represented therein. FIG. 3B is an example representation of a product scanning GUI 340 including an identified available product portion 342 executing on a mobile computing device (e.g., host device 310), in accordance with some embodiments. The GUI 340 may be displayed, for example, in response to selection of the new image option 324 of FIG. 3A, and may be the second GUI of the metadata extraction process represented by FIGS. 3A-3C. As illustrated in FIG. 3B, the host device 310 may visually indicate the portion(s) of the captured image and/or video stream that the device 310 identifies as the available product prior to and/or while the device 310 performs a machine vision technique on the visually indicated portion(s).

In certain embodiments, the host device 310 may prompt the user to indicate whether or not the identified portion of the captured image and/or video stream is an available product portion. For example, the host device 310 may render an acceptance option (not shown) and a declination option (not shown) on the product scanning GUI 340. If the host user indicates that the identified portion of the captured image and/or video stream is an available product portion (e.g., the host user interacts with the acceptance option), the host device 310 may proceed to perform the machine vision technique on the available product portion. However, if the host user indicates that the identified portion of the captured image and/or video stream is not an available product portion (e.g., the host user interacts with the declination option), the host device 310 may proceed to identify another portion of the captured image and/or video stream and/or the host device 310 may prompt the user to adjust the positioning of the available product.

Further, in certain embodiments, the host device 310 may render the identified product portion 342 on the visual display 318 as an indication of the host device 310 performing a machine vision technique on the identified product portion 342. For example, the host device 310 may identify the identified product portion 342 as a front surface of a sports card, and the device 310 may proceed to perform optical character recognition on the front surface. In this example, the host device 310 may render the identified product portion 342 on the visual display 318 to indicate to the host user that the device 310 is currently performing OCR on the front surface of the sports card.

In any event, when the host device 310 identifies an available product within the captured image and/or video stream, the host device 310 may proceed to perform a machine vision technique on the available product. FIG. 3C is an example representation of a product scanning GUI 350 including an extracted image 352 of an available product executing on a mobile computing device (e.g., host device 310), in accordance with some embodiments. The GUI 350 may be displayed, for example, in response to the host user indicating that the identified portion of the captured image and/or video stream is an available product portion (e.g., the host user interacts with the acceptance option), and may be the third GUI of the metadata extraction process represented by FIGS. 3A-3C.

Generally, the host device 310 may execute a machine vision technique on the identified available product represented in the captured image and/or video stream, and as a result, may extract metadata corresponding to the available product. The extracted metadata may include, for example, a name of the available product, a date of production, a category member (e.g., a team name, a division name, a player name, etc.), or a manufacturer of the available product. The host device 310 may also generate the extracted image 352 of the available product by resizing, rotating, and/or otherwise adjusting the representation of the available product in the captured image and/or video stream to fit the dimensions of the visual display 318.

Moreover, the host device 310 may store the metadata in a database (e.g., memories of the auction server 124) with a storage location corresponding to the available product. The host device 310 may then retrieve and/or otherwise access the metadata for the available product during the online session. In particular, during the online session, the host device 310 may capture (e.g., via camera 314) a subsequent image of the available product, execute the machine vision algorithm to determine that the available product is represented in the subsequent image, and cause each external user computing device connected to the online session to display the metadata while the available product is within a field of view of the camera 314.

Randomizing Assignment of Category Members

FIGS. 4A-4D illustrate example GUIs that may be displayed via the visual display 318 of the host device 310, these GUIs generally enabling the host user to associate external users participating in the online session with one or more category members of available products included as part of an inventory of the host user (i.e., a current inventory associated with a unique user profile of the host user). The GUIs of FIGS. 4A-4D may be displayed, for example, by host device 310 executing the host application 114 of FIG. 1.

Figure 4A:
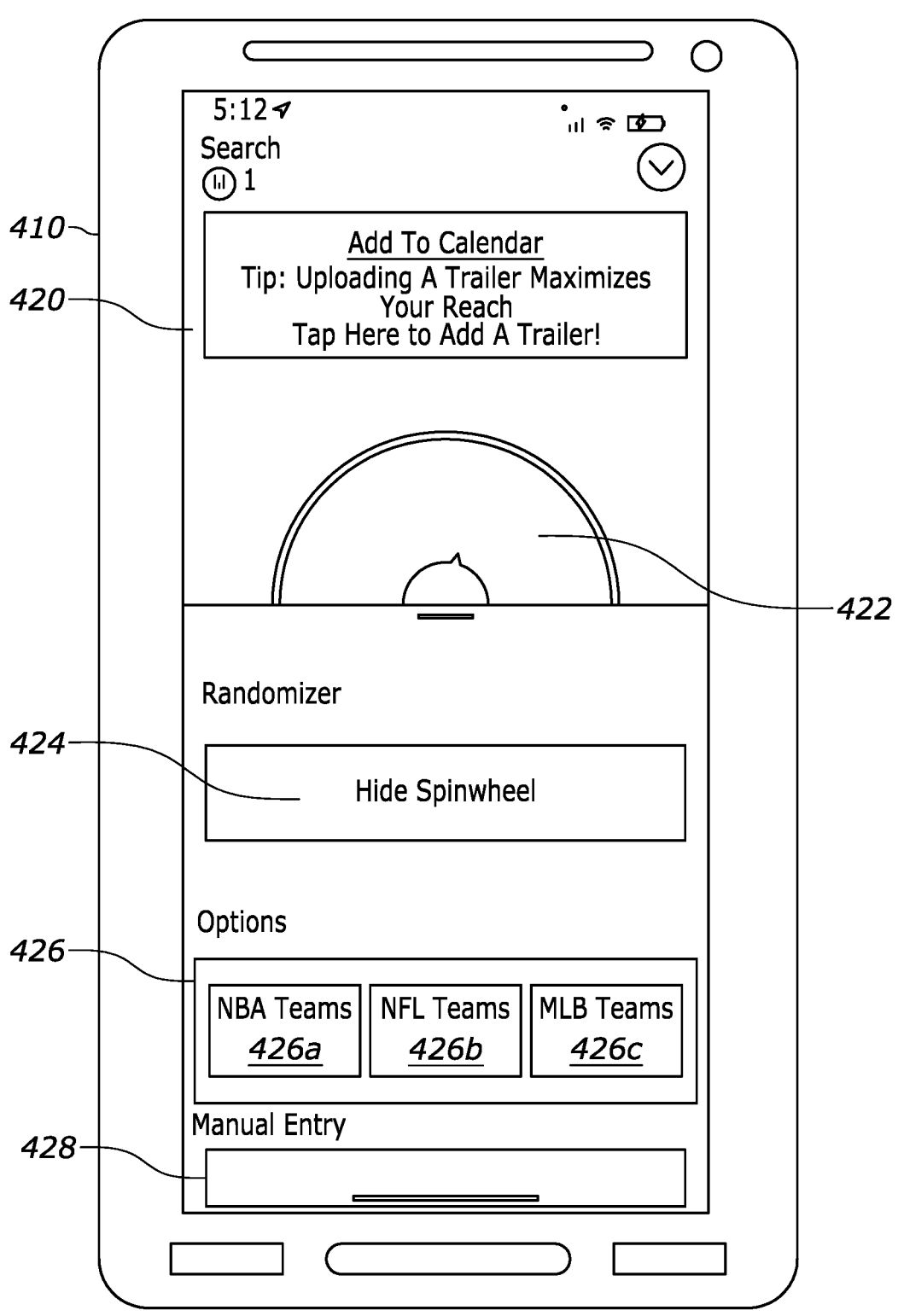
FIG. 4A is an example representation of a configuration screen for an animated randomization graphical user interface (GUI) executing on a mobile computing device, in accordance with some embodiments.

First, FIG. 4A illustrates an example GUI 420 rendered on a host device 410 that may be accessed, for example, by the host user prior to and/or during an online session to customize an animated randomization graphical overlay. The example GUI 420 includes an empty randomization graphical overlay 422, a hide/show option 424, a set of category options 426 including a first category option 426a, a second category option 426b, and a third category option 426c, and a manual category entry option 428. The empty randomization graphical overlay 422 may include sections for each category member for each category that is included in the subsequent auction of the online session.

The other options 424, 426, and 428 included as part of the example GUI 420 may generally provide the host user with various options to modify/adjust the empty randomization graphical overlay 422. The hide/show option 424 may enable a host user to hide the empty randomization graphical overlay 422 prior to and/or during the online session, such that the overlay 422 is rendered or not rendered on displays of the computing devices participating in the online session. The set of category options 426 may broadly enable a host user to define the categories and/or category members included on the empty randomization graphical overlay 422 when the host user proceeds to randomly assign category members to external users during the online session. For example, the first category option 426a may correspond to basketball teams, the second category option

426b may correspond to football teams, and the third category option 426c may correspond to baseball teams. The manual category entry option 428 may enable a host user to manually enter categories and/or category members for display on the empty randomization graphical overlay 422 in the event that the categories and/or category members included in the auction of the host user's online session are not included in the set of category options 426.

Figure 4B:
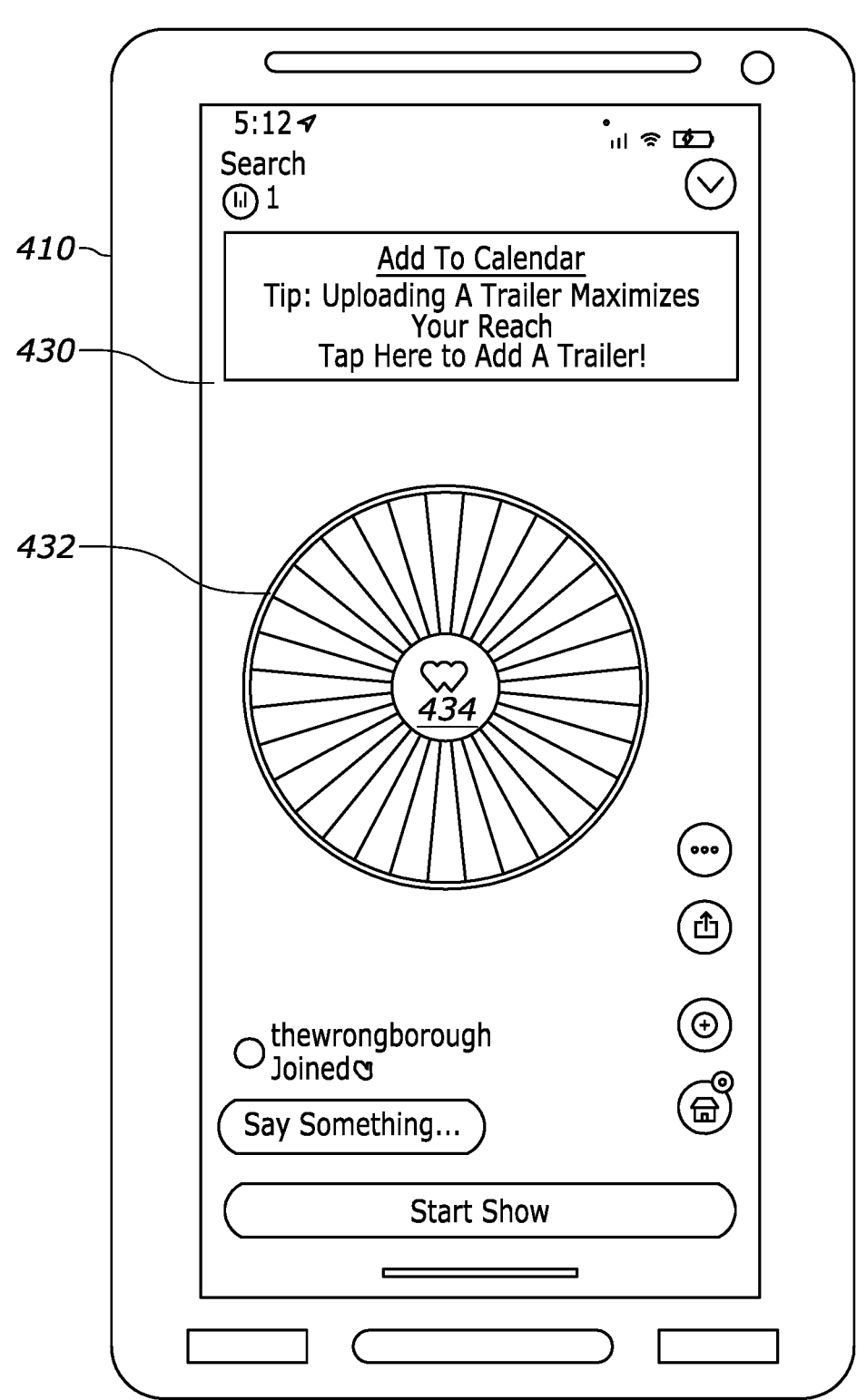
FIG. 4B is an example representation of an animated randomization GUI executing on a mobile computing device, in accordance with some embodiments.

In any event, when the host user is finished modifying/ adjusting the empty randomization graphical overlay 422, the host device may display a graphical overlay that includes each of the categories and/or category members selected by the host user. As an example, FIG. 4B is an example representation of an animated randomization GUI 430 executing on the host device 410, in accordance with some embodiments. The animated randomization GUI 430 may generally correspond to a host user performing a randomized category member assignment during an online session. The GUI 430 includes a randomization graphical overlay 432 that includes sections corresponding to each category and/or category member associated with at least one available product for auction as part of the online session. For example, the randomization graphical overlay 432 may include individual football/basketball/baseball teams and any other teams, divisions, and/or categories or combinations thereof.

The randomization graphical overlay 432 includes a randomization animation button 434 that may cause the overlay 432 to animate (e.g., spin) in a manner that simulates a random selection of a category member. The host device 410 and/or an auction server (e.g., auction server 124) may generally determine random assignments of the category members instantaneously or nearly instantaneously after the host user interacts (e.g., clicks, taps, swipes, issues a voice command, etc.) with the randomization animation button 434, and the system may cause the randomization graphical overlay 432 to animate and select the determined assignment. Alternatively, the system may cause the overlay 432 to animate, and the selection of the category member may be based on the section of the overlay 432 indicated by the randomization animation button 434 when the animation stops. In any event, the host user may interact with the randomization animation button 434 to randomly assign categories and/or category member(s) for each external user participating in the online session.

Figure 4C:
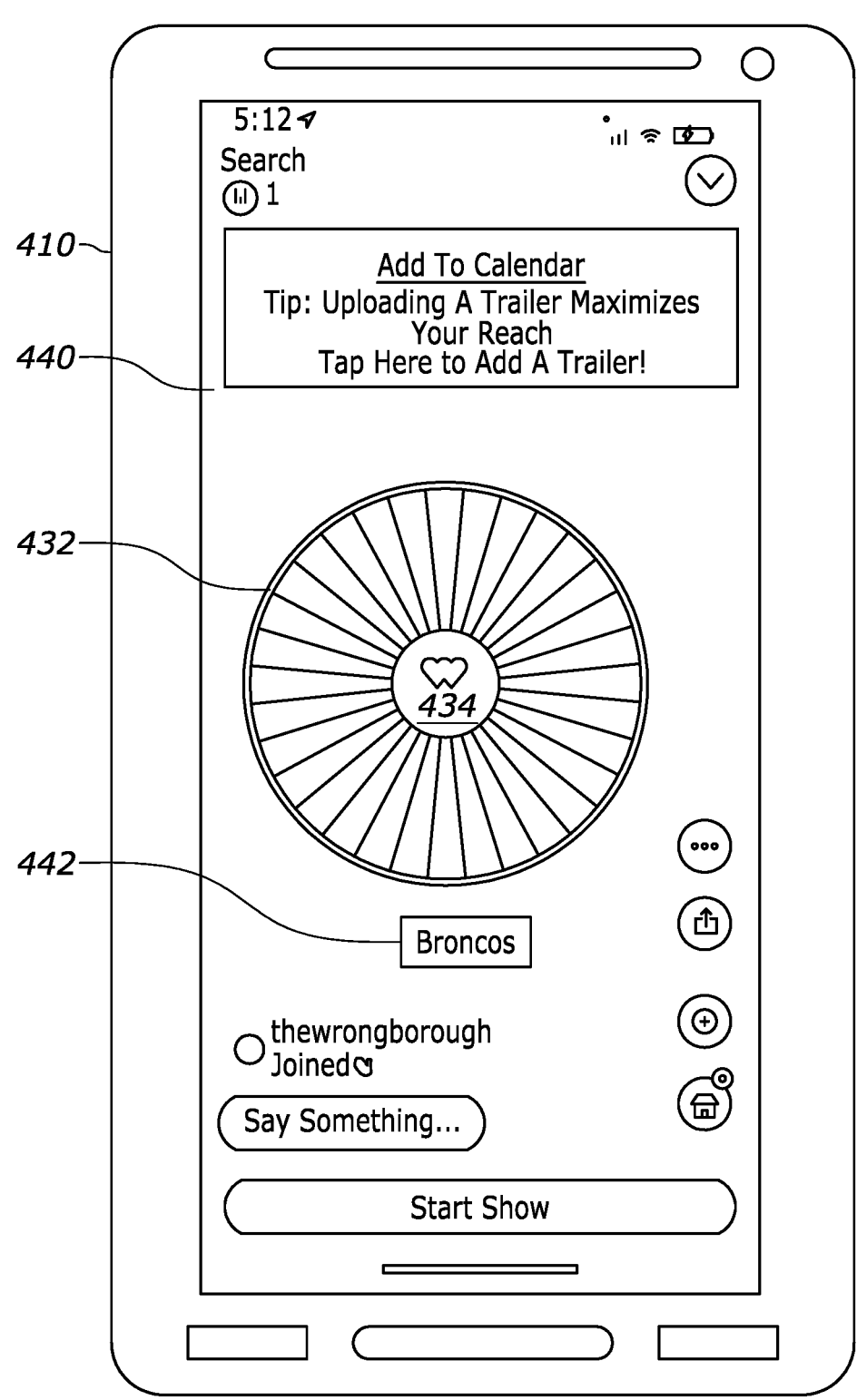
FIG. 4C is an example representation of an animated randomization GUI including a determined category member executing on a mobile computing device, in accordance with some embodiments.

FIG. 4C is an example representation of an animated randomization GUI 440 including a determined category member 442 executing on the host device 410, in accordance with some embodiments. The animated randomization GUI 440 may be rendered immediately following the animation resulting from the host user interacting with the randomization animation button 434 stopping. The determined category member 442 may correspond to the section of the randomization graphical overlay 432 indicated by the randomization animation button 434, and the determined category member 442 may be rendered on the displays of each external user computing device. Thereafter, the host device 410 and/or an auction server (e.g., auction server 124) may store an association between the determined category member 442 and an external user. In particular, the host user may interact with the randomization animation button 434 to animate the randomization graphical overlay 432 and thereby assign a category member for each external user that purchased and/or otherwise registered to participate in the online session.

Figure 4D:
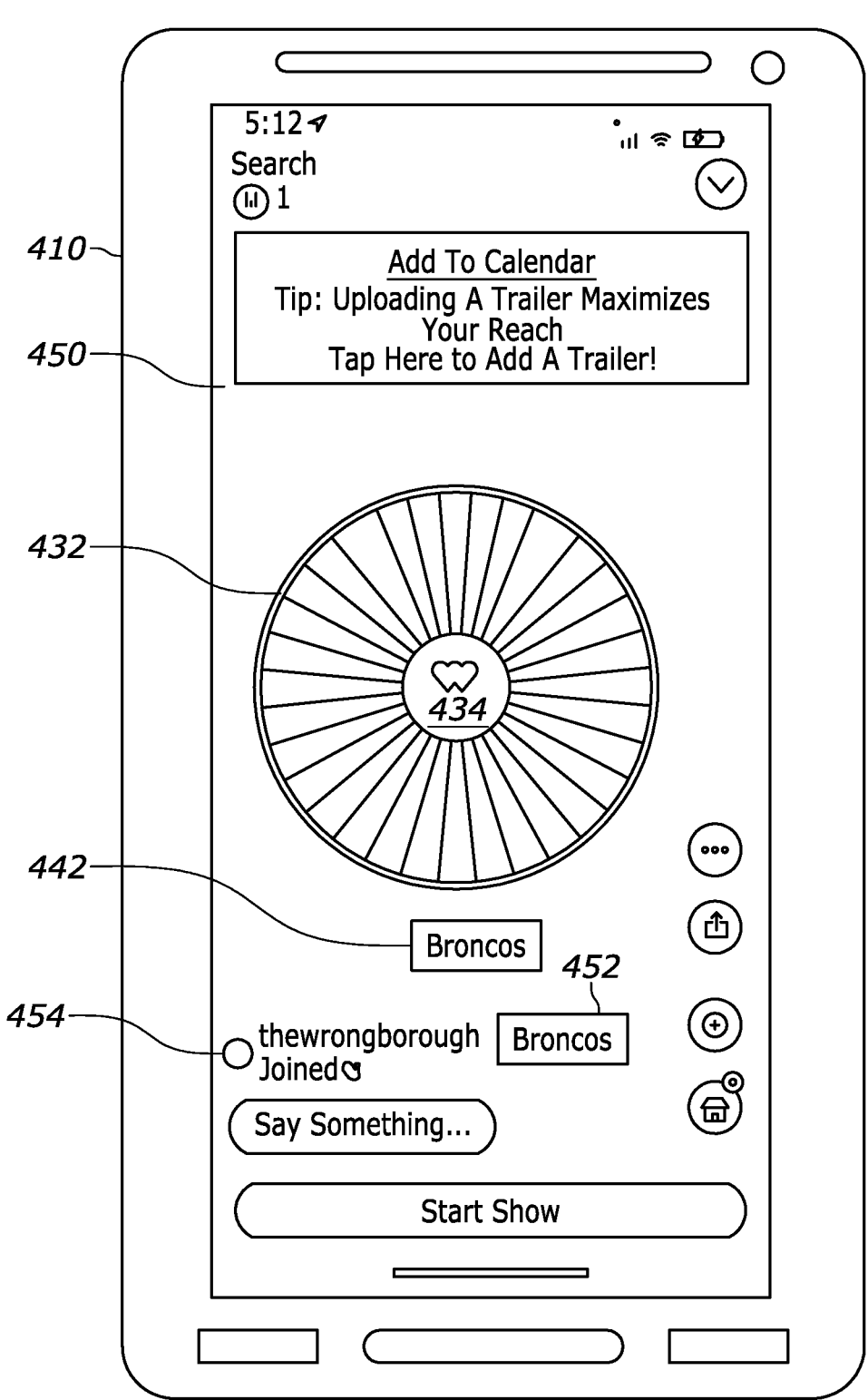
FIG. 4D is an example representation of an animated randomization GUI including a graphical indication of a determined category member executing on a mobile computing device, in accordance with some embodiments.

FIG. 4D is an example representation of an animated randomization GUI 450 including a graphical indication 452 of a determined category member executing on the host device 410, in accordance with some embodiments. The animated randomization GUI 450 may be rendered on each connected device (e.g., host device 410 and external user devices 204a-204c) following the animated randomization GUI 440. More specifically, when the determined category member 442 is assigned to an external user, the host device 410 and/or an auction server (e.g., auction server 124) may render the graphical indication 452 proximate to the external user's profile picture 454 and/or other external user representation (e.g., username, chat panel, etc.). In this manner, the system may provide external users with visual indications of assigned categories and/or category members for their reference during the online session. For example, a first user may have two graphical indications and a second user may have one graphical indication proximate to their corresponding user profiles. In this example, the first user may receive any available products in the subsequent auction that are associated with either of the two graphical indications corresponding to the first user's profile, and the second user may receive any available products in the subsequent auction that are associated with the one graphical indication corresponding to the second user's profile.

Host User Utilities to Enhance Online Sessions

Figure 5A:
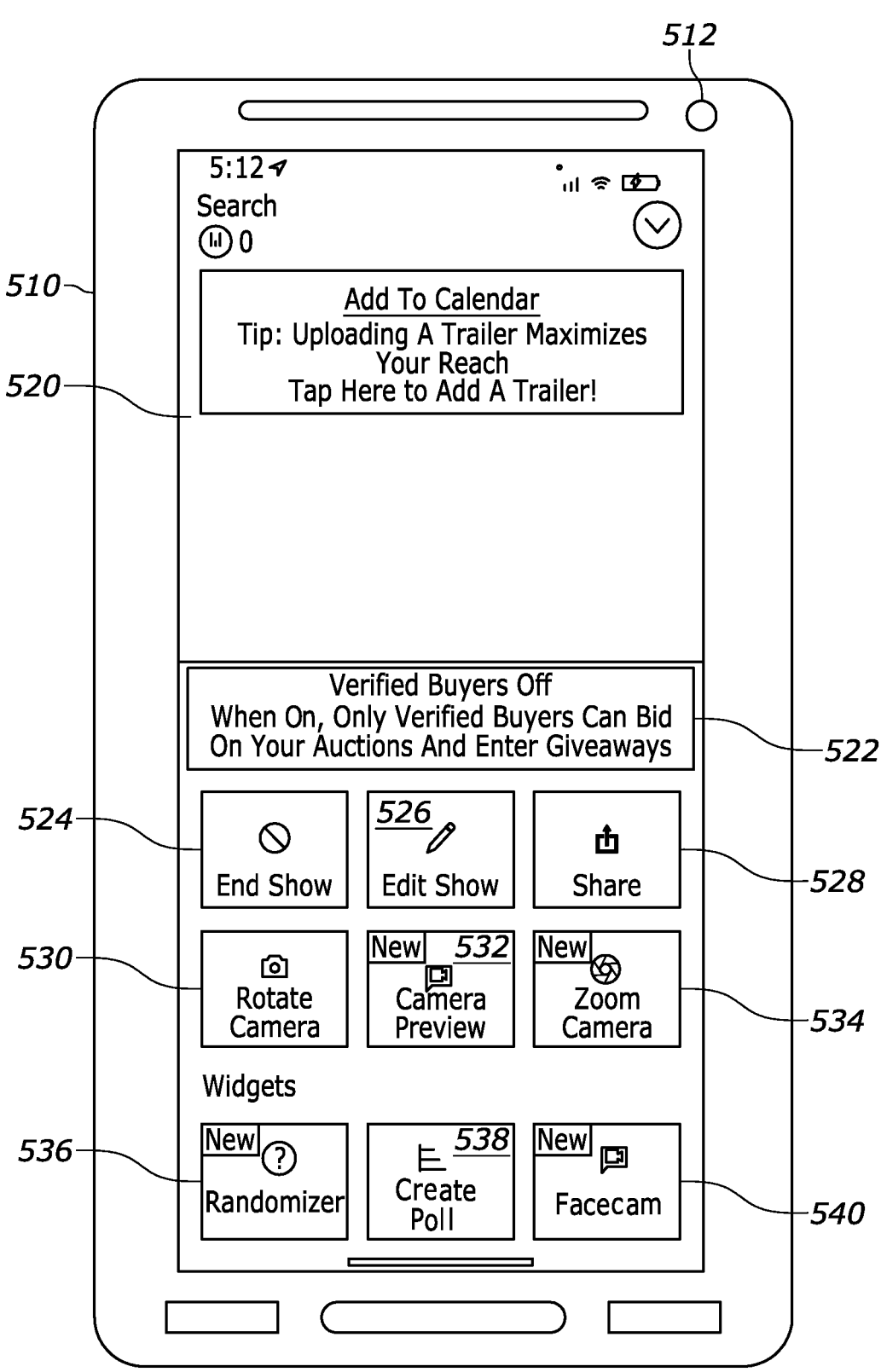
FIG. 5A is an example representation of a host utility GUI executing on a mobile computing device, in accordance with some embodiments.

FIG. 5A is an example representation of a host utility GUI 520 executing on a host device 510 with a camera 512, in accordance with some embodiments. Generally, the host utility GUI 5200 includes a number of individual host utilities that enable a host user to enhance an online session. For example, the host utility GUI 520 includes a verified buyer option 522, an end session option 524, an edit session option 526, a share session option 528, a rotate camera option 530, a camera preview option 532, a zoom camera option 534, a randomizer option 536, a create poll option 538, and a facecam option 540.

Each of these host utilities provided on the host utility GUI 520 may modify, adjust, and/or otherwise change one or more aspects of the online session. The verified buyer option 522 may enable a host user to limit the external users that may participate in auctions or other direct sales as part of the online session to those external users that are "verified buyers", such as users that are verified by the online platform hosting the online session. The end session option 524 enables the host user to terminate the online session, and the edit session option 526 may enable the host user to edit some aspect of the online session (e.g., a title of the online session, a listed category of the online session, etc.). The share session option 528 may enable the host user to share a link to the online session to external user device via any suitable communication interface (e.g., text message, email, direct message over online platform). The rotate camera option 530 may enable the host user to rotate the field of view of the camera 512 prior to and/or during the online session, the camera preview option 532 may enable the host user to preview the field of view of the camera 512 prior to and/or during the online session, and the zoom camera option 534 may enable the host user to adjust the zoom setting of the camera 512 prior to and/or during the online session.

The widgets provided near the bottom of the host utility GUI 520 may enable the host user to apply and/or add various graphical effects to the online session. The randomizer option 536 may enable the host user to render a randomization graphical overlay (e.g., randomization graphical overlay 432) on the displays of all connected devices. The create poll option 538 may enable the host user to create polls for transmission to the connected devices to receive external user input related to available products and/or other content associated with the online session. The facecam option 540 may enable the host user to overlay a facecam over the GUI of the online session. An example GUI representative of the facecam rendered by the facecam option 540 is illustrated in FIG. 5B.

Figure 5B:
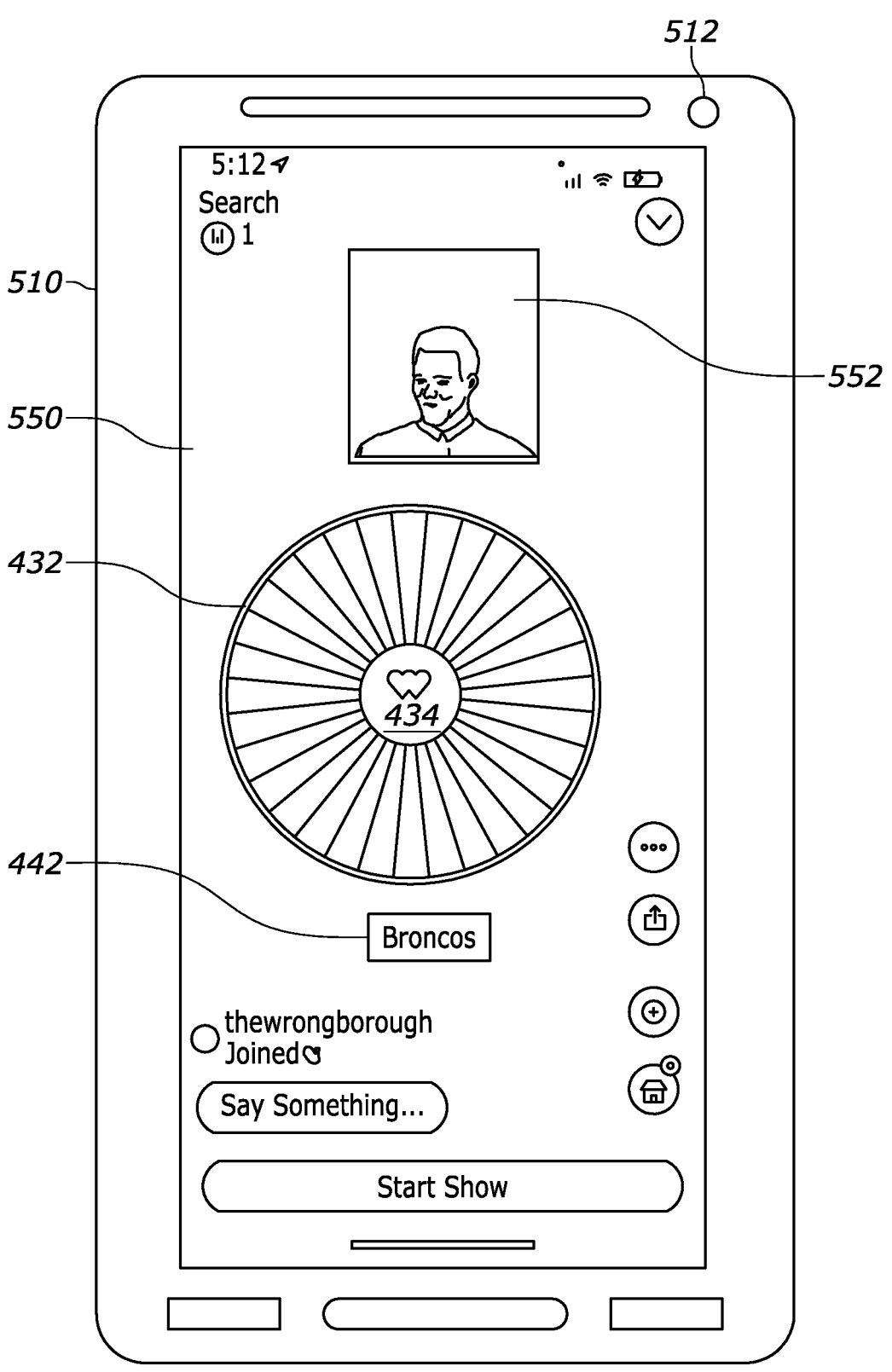
FIG. 5B is an example representation of a host utility incorporated into an animated randomization GUI executing on a mobile computing device, in accordance with some embodiments.

FIG. 5B is an example representation of a host utility (e.g., facecam 552) incorporated into an animated randomization GUI 550 executing on the host device 510, in accordance with some embodiments. Namely, the animated randomization GUI 550 may include the randomization graphical overlay 432, the randomization animation button 434, and the determined category member 442 included as part of the animated randomization GUI 440 of FIG. 4C. The host user may have selected the facecam option 540, and as a result, the host device 510 may render a facecam 552 on the animated randomization GUI 550, utilizing a real-time audio/video stream of the camera 512. In this manner, the host user may show their face and/or any other suitable perspective during the online session in addition to the randomization graphical overlay 432, the randomization animation button 434, the determined category member 442, and/or any other rendered features.

Integrated Grading Service for Online Sessions

Figure 6A:
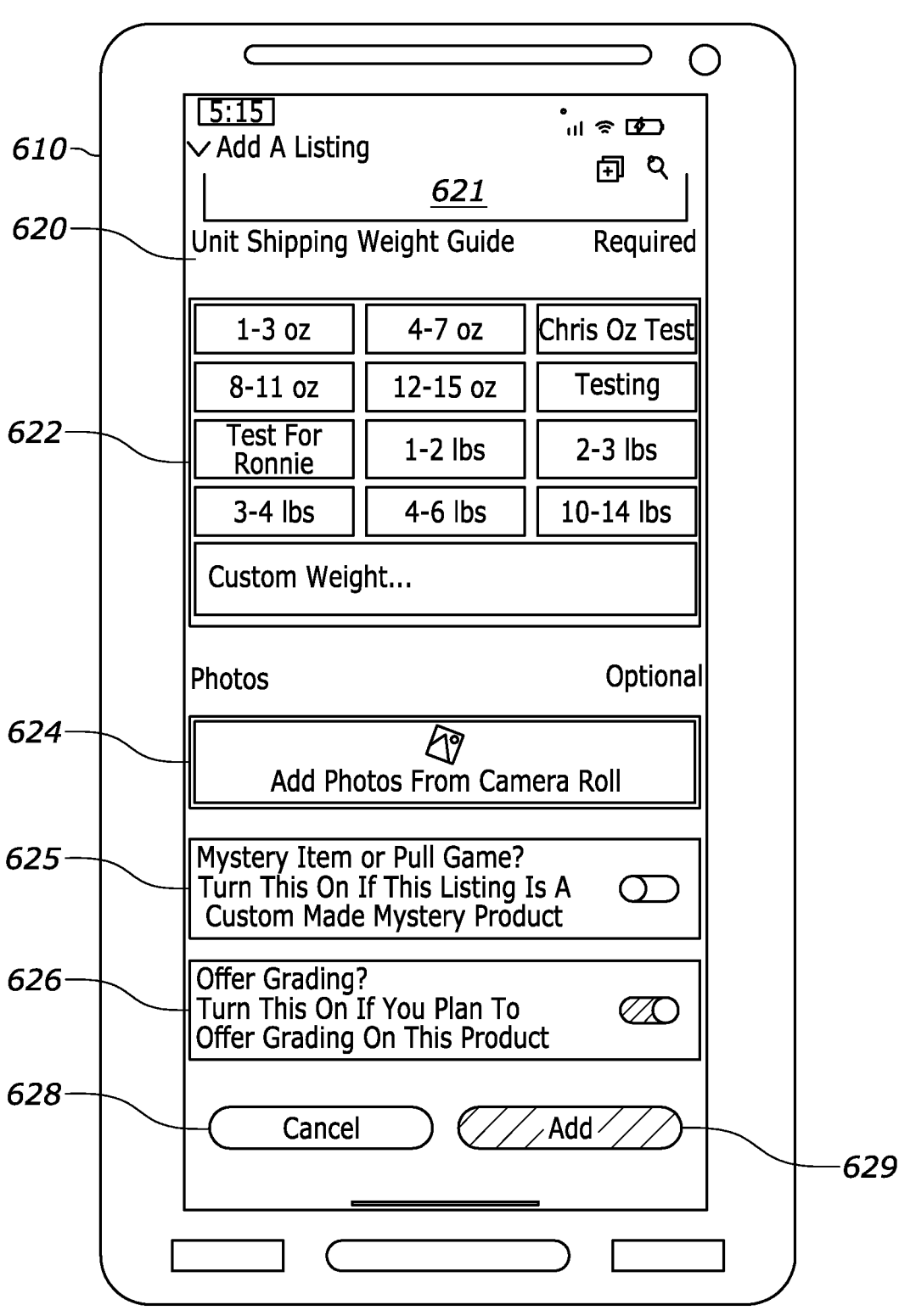
FIG. 6A is an example representation of an integrated grading GUI including an integrated grading option executing on a mobile computing device, in accordance with some embodiments.

FIG. 6A is an example representation of an integrated grading GUI 620 including an integrated grading option 626 executing on a host device 610, in accordance with some embodiments. Generally, the integrated grading GUI 620 may provide a host user with multiple options related to an available product that the host user intends to offer as part of an auction taking place during an online session. These options include providing a title/name for the available product in a title entry box 621, entering a shipping weight of the available product in the shipping weight option 622, providing a photograph of the available product in the photo option 624, identifying whether or not the available product is a custom product in the custom product option 625, indicating whether or not grading is included as part of the available product listing in the integrated grading option 626, and indicating whether to delete the available product listing (cancel option 628) or to include the available product listing as part of the online session (add option 629).

In particular, the integrated grading option 626 enables the host user to offer grading for a particular available product, and if selected, the option 626 may automatically cause the host device 610 and/or the auction server (e.g., auction server 124) to generate shipping labels accordingly. An available product that includes integrated grading may be automatically shipped to a grading provider following the online session, such that the purchasing external user may receive the available product encased in a polycarbonate (or other suitable material) casing with an official record of a grading performed with respect to the available product. The host device 610 and/or the auction server 124 may store grading provider information, and may automatically determine an optimal grading provider for the available product based on profile information of the grading provider(s) stored in the device 610 and/or the server 124 (or connected databases/servers). Regardless, if the host user decides to offer integrated grading for an available product, the external user may be prompted to accept or decline the integrated grading.

Figure 6B:
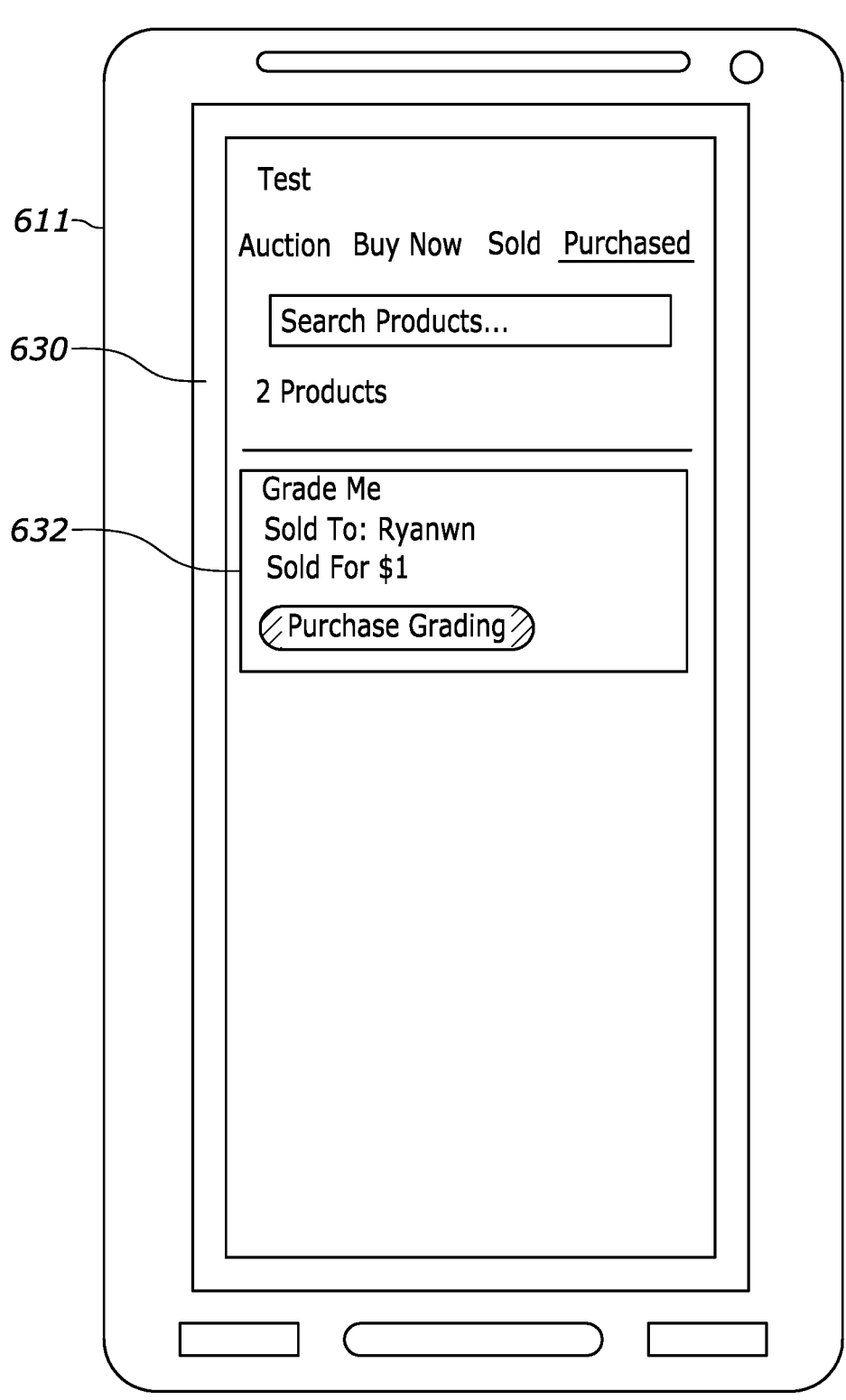
FIG. 6B is an example representation of an integrated grading GUI including another integrated grading option executing on a mobile computing device, in accordance with some embodiments.

To illustrate, FIG. 6B is an example representation of an integrated grading GUI 630 including another integrated grading option 632 executing on an external user device 611, in accordance with some embodiments. As illustrated in FIG. 6B, the external user may navigate within the application (e.g., external user application 116) used to access the online session to view any purchased products (e.g., purchased during an online session). Under the purchased tab of FIG. 6B, the external user has a purchased product that has the integrated grading option 632 prompting the external user to consider whether or not to pay an additional fee (e.g., $1, $3, $5, or any suitable amount) to have the application automatically determine a suitable grading provider, print a shipping label to have the product shipped from the host user to the grading provider prior to shipment to the external user, and to track shipping information and grading information corresponding to the purchased product. If the external user decides to choose the integrated grading option 632, the external user may be presented with additional information corresponding to the process of receiving grading for the purchased product.

Figure 6C:
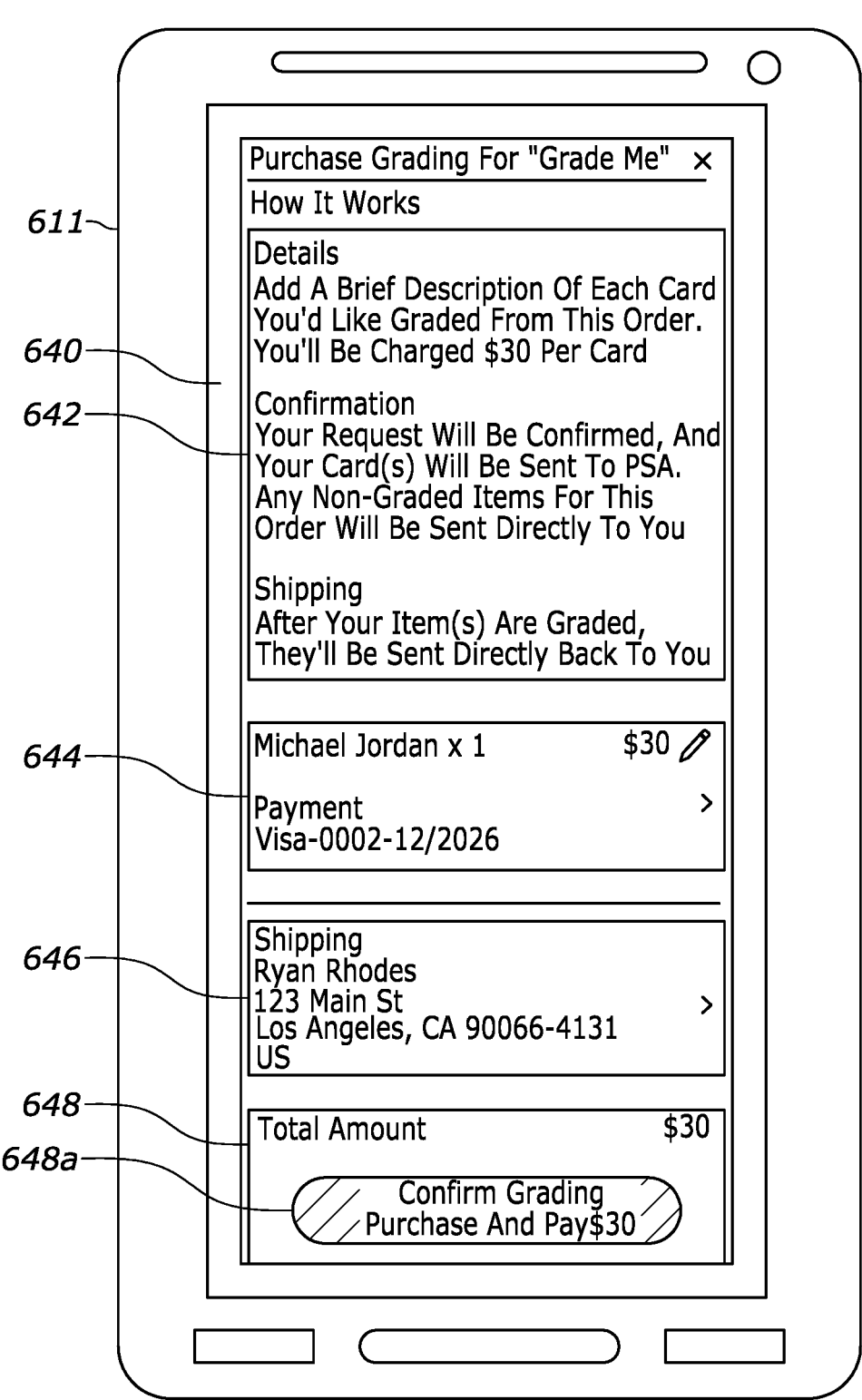
FIG. 6C is an example representation of an integrated grading GUI including an informational panel executing on a mobile computing device, in accordance with some embodiments.

FIG. 6C is an example representation of an integrated grading GUI 640 including informational panels 642, 644, 646, and 648 executing on an external user device, in accordance with some embodiments. These informational panels 642, 644, 646, and 648 provide the external user with additional information related to the integrated grading process for a purchased product. The first informational panel 642 describes details of the grading process, to enable the external user to better understand the procedures and steps required for the purchased product to be graded and subsequently shipped to the external user. The second informational panel 644 may enable the external user to review purchase information related to the purchased product (e.g., product name, product purchase price, payment method, etc.). The third informational panel 646 may enable the external user to review shipping information including shipping logistics (e.g., estimated arrival date/time) from the host user to the grading provider and from the grading provider to the external user. The fourth informational panel 648 may include a total price for the purchased product that includes the integrated grading service, and a confirmation button 648a that submits the request for purchase and the integrated grading service from the external user device 611 to the host device 610.

Figure 6D:
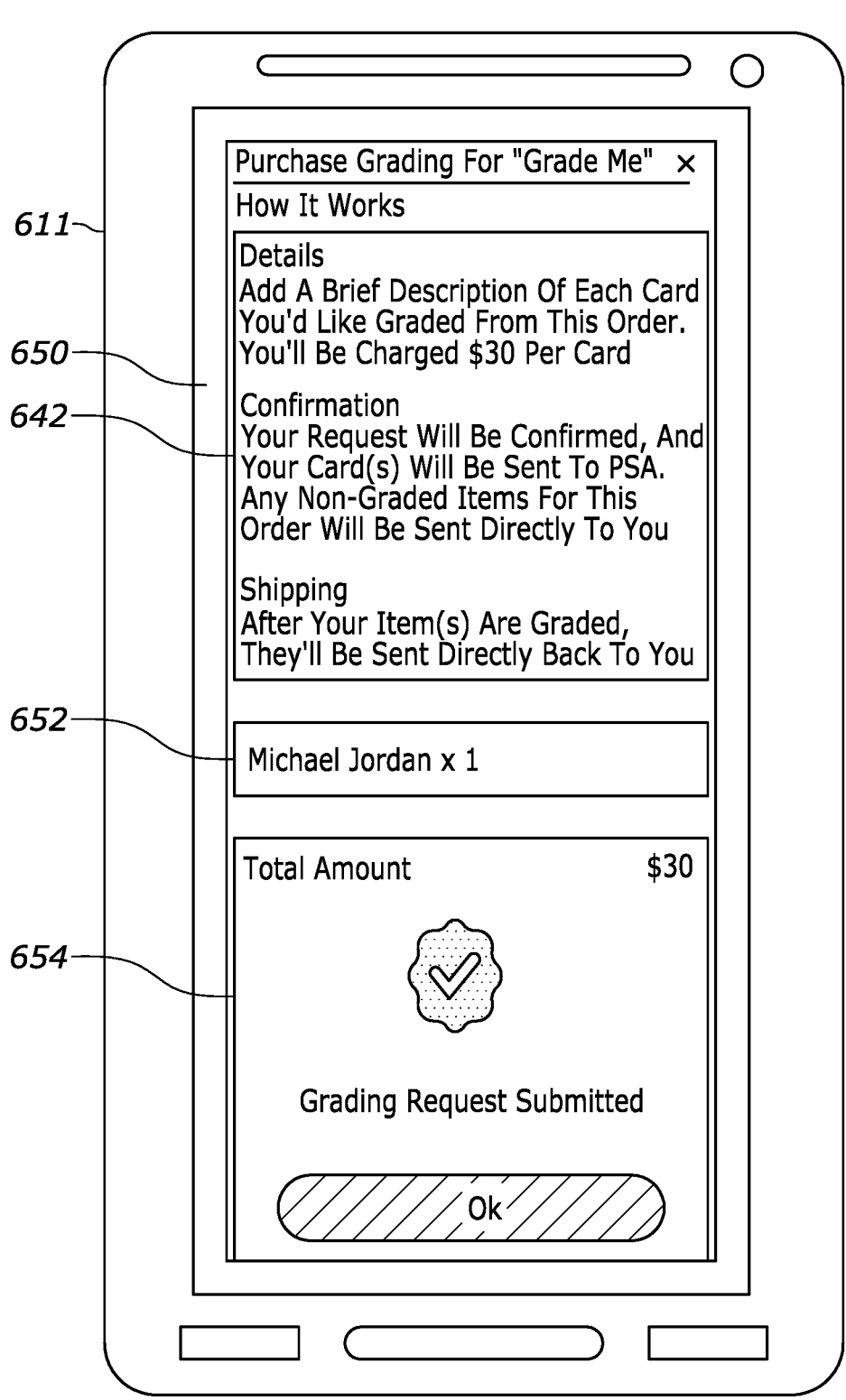
FIG. 6D is an example representation of an integrated grading GUI including yet another informational panel executing on a mobile computing device, in accordance with some embodiments.

When the external user interacts with the confirmation button 648a, the external user device 611 may render the integrated grading GUI 650 of FIG. 6D. More specifically, FIG. 6D is an example representation of the integrated grading GUI 650 including additional informational panels executing on the external user device 611, in accordance with some embodiments. The integrated grading GUI 650 may include the same first informational panel 642 from the integrated grading GUI 640 of FIG. 6C, and the integrated grading GUI 650 may further include a fifth informational panel 652 and a sixth informational panel 654. The fifth informational panel 652 may be similar to the second informational panel 644, and may differ by not including the payment information that was included in the second informational panel 644. The sixth informational panel 654 may generally include the purchase price also indicated in the fourth informational panel 648, and the sixth informational panel 654 may also include a grading request submitted indication. The grading request submitted indication may indicate to the external user that the purchased product will be shipped to a grading provider for grading prior to the purchased product being shipped to the external user.

*Example Mobile Computing Device and Server*

Figure 7:
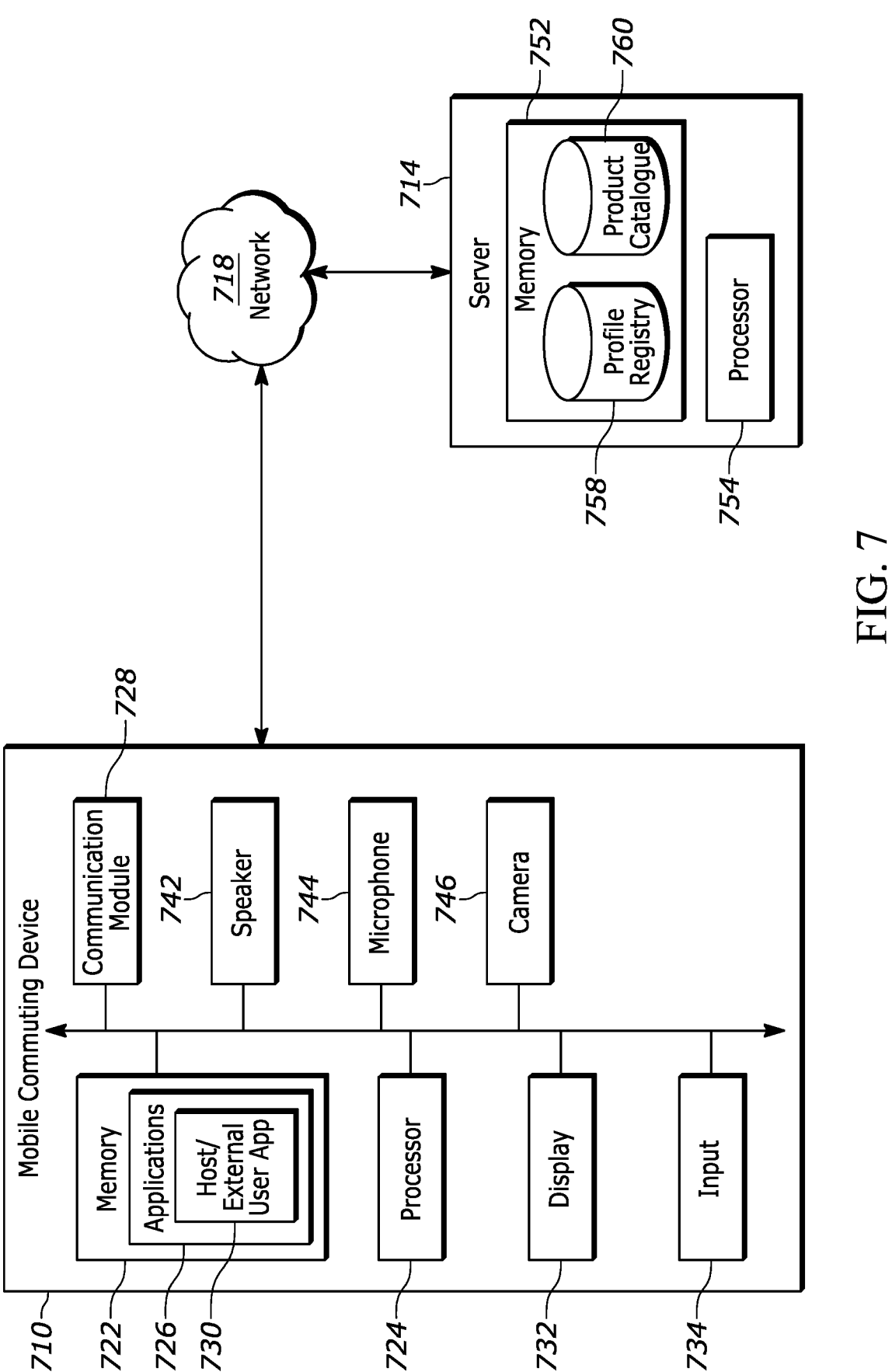
FIG. 7 is a block diagram of an example mobile computing device and server, in accordance with some embodiments.

FIG. 7 illustrates a block diagram of example components of a mobile computing device 710 and a server 714 communicating over a network 718, in accordance with embodiments of the systems and methods described herein. The mobile computing device 710 may correspond, for example, to any of the mobile computing devices of the present description (e.g., the host device 110a, 202, 310, 410, 510, or 610, the external user device 110b, 204a, 204b, 204c, 611, etc.). The server 714 may correspond, for example, to the auction server 124 and/or 224, and/or to another one or more servers of the present description. The mobile computing device and/or server 714 may include additional, fewer, or alternate components to those described in this section, in various embodiments. Additionally, in some embodiments, the mobile computing device 710 may be substituted for another computing device(s), e.g., a desktop computer or laptop computer.

The mobile computing device 710 may include a memory 722, which may include one or more non-transitory memories (e.g., ROM) and/or one or more volatile memories (e.g., RAM). In particular, non-transitory portions of the memory 722 may store non-transitory, computer executable instructions that are executable by a processor 724 (i.e., one or more processors) to cause the mobile computing device 710 to perform actions described in this detailed description. Non-transitory portions of the memory 722 may include one or more applications 726. Each respective application 726 may include one or more sets of non-transitory computer executable instructions that, when executed by the processor 724, cause the mobile computing device 710 to perform operations associated with the respective application 726 (e.g., operations involving the processor 724, a communication module 728, and/or other components of the mobile computing device 710 discussed herein). The one or more applications may include an auction application 730 ("Host/external user app") usable to access online sessions for live auction events and/or direct sales, as described herein.

The mobile computing device 710 may include a display unit 732 (i.e., one or more display devices, such as a touch-enabled visual display ("touchscreen") or other visual display). The mobile computing device may further include an input unit 734 (i.e., one or more user input devices, e.g., a touchscreen or touchpad, a keyboard, a mouse, etc.). In some embodiments, aspects of the display unit 732 and 734 are integrated (e.g., as a touchscreen with both touch input and display capability). The display unit 732 and/or the input unit 734 may be physically included within the mobile computing device 710 (e.g., a fixedly installed touchscreen), or may be operatively coupled with the mobile computing device 710 by other means (e.g., a peripheral touch pad, mouse, keyboard, etc. connected to the mobile computing device 710 by wired and/or wireless means).

The mobile computing device 710 may include a speaker 742, a microphone 744, and/or a camera 746. In some embodiments, the mobile computing device 710 may include still other sensor components, e.g., a positioning unit (e.g., GPS), an accelerometer, a gyroscope, etc. The speaker 742, microphone 744, camera 746, and/or other sensor component(s) may be physically included within the mobile computing device 710 (e.g., a natively installed speaker, microphone, or camera), and/or may be operatively coupled with the mobile computing device 710 by other means (e.g., a peripheral camera, speaker, or microphone connected to the mobile computing device 710 by wired and/or wireless means).

Collectively, the display unit 732, input unit 734, speaker 742, microphone 744, camera 746, and/or other sensing component(s) may provide one or more user interfaces of the mobile computing device 710. For example, the display unit 732 may display/present one or more graphical user interfaces (GUIs) which may include interactive controls that the user of the mobile computing device 710 can activate via the input device 734 to cause functionalities described herein to be performed (e.g., via a touchscreen tap or swipe, a mouse click, a keyboard stroke, etc.). Addition- ally, or alternatively, in some embodiments, similar user interfaces may be provided at least partially by the speaker 742, microphone 744, camera 746, and/or other sensing components of the mobile computing device 710 (e.g., an interactive audio interface, a gesture-based user interface, or a user interface responsive to physical movement of the mobile computing device 710). In some embodiments, a user of the auction application 730 at the mobile computing device 710 may configure device permissions defining com- ponents of the mobile computing device 710 the auction application 730 may use to provide GUIs, provide notifica- tions, and/or perform other functionalities.

The server 714 (i.e., one or more servers, e.g., the auction server 124 and/or other servers of FIG. 1) include a memory 752, which may include one or more non-transitory memo- ries (e.g., ROM) and/or one or more volatile memories (e.g., RAM). In particular, non-transitory portions of the memory 752 may store non-transitory, computer executable instruc- tions that are executable by a processor 754 (i.e., one or more processors) to cause the mobile computing device to perform actions described in this detailed description. Non- transitory portions of the memory 752 may include, for example, one or more applications containing non-transitory instructions for controlling logic and communications relat- ing to online sessions, user profiles, auctioning or purchas- ing items via live auction events and/or direct purchases during an online session, etc. The memory 752 may further include one or more APIs configured to control communi- cations between the server 714 and the mobile computing device 710. Still additionally or alternatively, the memory 752 may store a profile registry 758, which may store various information described herein as relating to user profiles and grading provider profiles, such as (but not limited to) purchase histories, grading proficiencies, and/or other data. Still yet additionally or alternatively, the memory 752 may store a product catalogue 760, e.g., defining known products available to be associated with online sessions (e.g., as described with respect to the product catalogue server 132 of FIG. 1).

The network 718 may include any suitable one or more communications networks, e.g., the Internet, a wired or wireless local area network (LAN), etc. Communications over the network 718 may include communications accord- ing to any suitable one or more communications protocols, including for example a mobile cellular communications protocol (e.g., CDMA, GSM, EV-DO, LTE, IP, etc.), one or more IEEE 802.11 protocols (e.g., Wi-Fi), Bluetooth, and/or other suitable protocols in accordance with the computing capabilities of the mobile computing device 710 and/or the server 714.

Various additional or alternative computing elements may be envisioned, in various embodiments. In particular, it should be understood that the server 714 may communicate over the network 718 with many mobile computing devices 714, e.g., belonging to various combinations of sellers (e.g., hosts) and/or buyers.

Example Computer-Implemented Methods

FIGS. 8A-8D illustrate block diagrams of example com- puter-implemented methods that may be performed by com- puting devices of the present description. At a high level, the methods of FIGS. 8A-8D relate to implementation of the various features and services of the present disclosure, e.g., a randomization algorithm and corresponding animated ran- domization graphical overlay, input layer flattening for addi- tional input layers with the real-time video stream of the online session, an integrated grading option to automatically and seamlessly connect host users and guests to graders, and a machine vision algorithm configured to extract metadata from images of available products featured as part of an online session.

In various embodiments, one or more memories of a computing device may store non-transitory, computer executable instructions that, when executed via one or more processors of the computing device, cause the computing device to perform actions of the computer-implemented methods described herein. Furthermore, in some embodi- ments, one or more non-transitory computer readable media may be provided (e.g., a non-removable computer memory, a removable flash drive, etc.), the one or more non-transitory computer readable media storing instructions that, when executed by one or more computing devices, cause the one or more computing devices to perform actions of the meth- ods described herein. Order of actions of the methods described in this section vary from the order illustrated, and actions of the methods may be combined and/or substituted with other actions described in this detailed description, in various embodiments.

First referring to FIG. 8A, a computer-implemented method 800 is provided. The method 800 may be performed, for example, via a server (i.e., one or more servers, e.g., the auction server 124 and/or other servers of FIG. 1, and/or the auction server 224 of FIG. 2) in communication with a one or more client computing devices (e.g., host and/or external user devices described herein) via a network (i.e., one or more networks).

The method 800 includes assigning, by a host user com- puting device, a category placeholder to each external user of a set of external users that are participating in an online session on the online platform (block 802). In some embodi- ments, a first external user has one category placeholder, and a second external user has two or more category placehold- ers. The method 800 further includes rendering an animated randomization graphical overlay on a display of each exter- nal user computing device that is connected to the online session (block 804). Each external user computing device may operate on behalf of an external user.

The method 800 further includes determining, by a ran- domization algorithm, a category member from a set of category members that is thereafter associated with a respec- tive category placeholder for a duration of the online session (block 806). Moreover, the method 800 includes causing the animated randomization graphical overlay to display an animated randomization sequence that selects the category member from the set of category members on the display of each external user computing device that is connected to the online session (block 808).

In certain embodiments, the set of category members is a set of available category members. Further in these embodi- ments, the randomization algorithm may also include instructions for iteratively determining a respective category member from the set of available category members that is thereafter associated with a respective category placeholder for the duration of the online session. In this manner, once a respective category member is associated with a respective category placeholder, the respective category member may be removed from the set of available category members.

In some embodiments, the method 800 may further include storing metadata indicating associations of category members with the respective category placeholders. In these embodiments, the method 800 may further include automatically generating, at an ending of the online session and based on the metadata, shipping labels that indicate products corresponding to the category members and shipping information of the external user to which the category placeholder was assigned.

In certain embodiments, the method 800 may further include, for each external user participating in the online session, rendering a graphical indication of the category member associated with the category placeholder assigned to the external user proximate to an icon representative of the external user on the display of each external user computing device during the online session. For example, the graphical indication may be or include the graphical indication 452 of FIG. 4D.

In some embodiments, the method 800 may further include receiving, from a host user, a lock indication that prohibits additional external users from receiving category placeholder assignments. Further, in certain embodiments, the animated randomization graphical overlay includes a graphical representation of a wheel with a plurality of sections. In these embodiments, each section may correspond to one of the category members from the set of category members, and the animated randomization sequence includes the wheel rotating until the wheel stops rotating and a section of the plurality of sections is selected.

Referring next to FIG. 8B, a computer-implemented method 820 is provided. Generally speaking, the method 820 may be performed by a client computing device associated with a host user (e.g., the host devices 110*a*, 202, 310, 410, 510, and/or 610). Actions of the method 820 may include communications between the client computing device and a server (i.e., one or more servers, e.g., the auction server 124 and/or other servers of FIG. 1, and/or auction server 224 of FIG. 2).

The method 820 includes receiving, during an online session on the online platform, an additional input layer for rendering on a display of each external user computing device that is connected to the online session (block 822). The online session may include rendering a real-time video stream input from a host user computing device on the display of each external user computing device connected to the online session. In some embodiments, the additional input layer includes at least one of: (i) an additional text layer, (ii) an additional video stream input, (iii) a video filter, (iv) an animation sequence, or (v) a visual graphic. The method 820 further includes layering the additional input layer with the video stream input in an order defined by a host user operating the host user computing device (block 824).

Further, the method 820 includes flattening the additional input layer and the video stream input into a single layer video input stream (block 826). The method 820 further includes causing the single layer video input stream to render on the display of each external user computing device during the online session (block 828).

In certain embodiments, the method 820 further includes receiving, from a host user computing device, an input requesting one or more additional input layer options. Further in these embodiments, the method 820 may include retrieving, from an input layer database (e.g., stored in the image/video server 128), the one or more additional input layer options. The method 820 may additionally include rendering, at a display of the host user computing device, the one or more input layer options.

In some embodiments, the additional input layer includes at least a first additional input layer and a second additional input layer, and the method 820 further includes receiving, from the host user computing device, an input indicating that the order includes both the first additional input layer and the second additional input layer layered on top of the real-time video input stream and at least one of: (i) the first additional input layer layered on top of the second additional input layer or (ii) the second additional input layer layered on top of the first additional input layer.

In certain embodiments, the method 820 includes receiving, from the host user computing device, an input indicating the order. Further, the method 820 may include generating a recommendation corresponding to the order that includes at least one of: (i) a recommended adjustment to the order or (ii) a recommended additional input layer.

In some embodiments, one or more memories (e.g., memories of a host device and/or an auction server) additionally store an input layer flattening algorithm (e.g., as part of the scanning module 126*d*). In these embodiments, the method 820 includes flattening the additional input layer and the real-time video stream input into a single layer video input stream by applying the input layer flattening algorithm to the additional input layer and the real-time video stream input.

Referring now to FIG. 8C, a computer-implemented method 840 is provided. Generally speaking, the method 840 may be performed by a client computing device associated with a host user (e.g., the host devices 110*a*, 202, 310, 410, 510, and/or 610). Actions of the method 840 may include communications between the client computing device and a server (i.e., one or more servers, e.g., the auction server 124 and/or other servers of FIG. 1, and/or the auction server 224 of FIG. 2).

The method 840 includes storing, during an online session on the online platform, an association indication between an available product in the online session and an external user participating in the online session (block 842). The method 840 further includes receiving an acceptance indication for an integrated grading option from the external user (block 844). Moreover, after the online session has concluded, the method 840 includes automatically generating a shipping label that causes the available product associated with the external user to be shipped to a grading provider prior to shipment to the external user (block 846).

The method 840 further includes receiving, from a grading provider device, a grading value corresponding to the available product (block 848). The method 840 may further include storing the grading value corresponding to the available product in a grading database (e.g., part of grading module 126*d*) that includes a storage location associated with prior grading values of the available product and prior sale values of the available product (block 850).

In certain embodiments, the grading database includes a host profile corresponding to a host user that is conducting the online session and the method 840 further includes updating the host profile with the grading value corresponding to the available product. In these embodiments, the method 840 includes displaying the grading value as part of a user interface rendered during a subsequent online session when the host user offers the available product during the subsequent online session.

In some embodiments, a plurality of external users participate in the online session, and the method 840 further includes rendering at a display of each external user computing device the integrated grading option. In these embodiments, the method 840 further includes receiving a declination indication for the automated grading option from a portion of the plurality of external users. Further, the method 840 may include, after the online session has concluded, automatically generating shipping labels for the portion of the plurality of users that causes available products associated with the portion of the plurality of users to be shipped directly to the portion of the plurality of users.

In certain embodiments, the method 840 further includes storing a sale value of the available product from the online session in the storage location. In these embodiments, the method 840 further includes accessing the storage location to retrieve the prior grading values of the available product and prior sale values of the available product. Further, the method 840 includes calculating one or more grading metrics corresponding to the available product that include the grading value and the sale value from the online session, and storing the one or more grading metrics in the storage location.

In some embodiments, the method 840 includes training a machine learning (ML) model with a plurality of training data that includes training image data of available products and training grading value corresponding to the training image data. The ML model may be trained to output a preliminary grading value corresponding to the available products. Further in these aspects, the method 840 may include capturing, by an imaging device, an image of the available product that includes a plurality of image data representative of the available product, and applying the ML model to the plurality of image data to output a preliminary grading value corresponding to the available product.

Moreover, the plurality of training data may further include a plurality of training price values of the available products, and the ML model may further be configured to output a preliminary price value corresponding to the available products. In these embodiments, the method 840 may further include applying the ML model to the plurality of image data to output the preliminary grading value and a preliminary price value corresponding to the available product. In some instances, these embodiments may include rendering, at a display of an external user computing device of the external user, the preliminary grading value. Upon receiving an interaction with the preliminary grading value from the external user, the method 840 may further include displaying at least a portion of the plurality of image data with a preliminary grading value indication. Additionally, or alternatively, the method 840 may include re-training the ML model based on the grading value received from the grading provider device and the preliminary grading value.

Figure 8D:
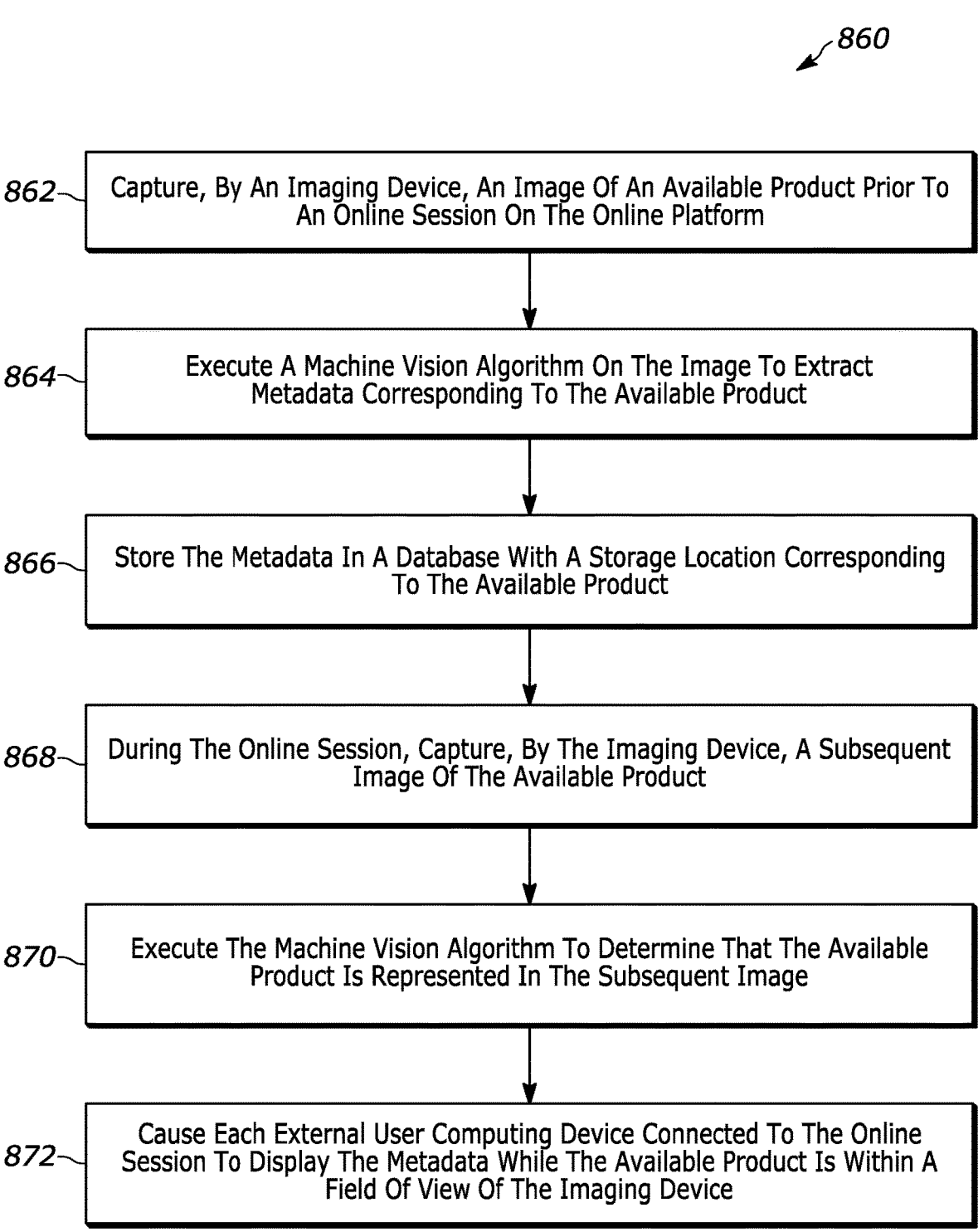
FIG. 8D is a flow diagram of still another example method performed via one or more servers for digital item management and randomization techniques in an online platform, in accordance with some embodiments.

Turning to FIG. 8D, a computer-implemented method 860 is provided. Generally speaking, the method 860 may be performed by a client computing device associated with a host user (e.g., the host devices 110a, 202, 310, 410, 510, and/or 610). Actions of the method 860 may include communications between the client computing device and a server (i.e., one or more servers, e.g., the auction server 124 and/or other servers of FIG. 1, and/or the auction server 224 of FIG. 2).

The method 860 includes capturing, by an imaging device, an image of an available product prior to an online session on the online platform (block 862). The method 860 further includes executing a machine vision algorithm on the image to extract metadata corresponding to the available product (block 864). In certain embodiments, the machine vision algorithm includes an optical character recognition (OCR) algorithm. Further, in some embodiments, the metadata includes at least one of: (i) a name of the available product, (ii) a date of production, (iii) a category member, or (iv) a manufacturer of the available product.

The method 860 further includes storing the metadata in a database with a storage location corresponding to the available product (block 866). Further, during the online session, the method 860 includes capturing, by the imaging device, a subsequent image of the available product (block 868). The method 860 further includes executing the machine vision algorithm to determine that the available product is represented in the subsequent image (block 870), and causing each external user computing device connected to the online session to display the metadata while the available product is within a field of view of the imaging device (block 872).

In certain embodiments, the method 860 further includes receiving an input from a first external user that includes at least a portion of the metadata corresponding to the available product. In these embodiments, the method 860 further includes searching the database for any storage location with metadata corresponding to the input, and retrieving a link to the online session based on the metadata stored in the storage location. Further, these embodiments include causing a first external user computing device of the first external user to display the link to the online session.

In some embodiments, the method 860 further includes, during the online session, executing the machine vision algorithm on the subsequent image to extract additional metadata corresponding to the available product. In these embodiments, the method 860 further includes storing the additional metadata in the storage location corresponding to the available product, and causing each external user computing device connected to the online session to display the additional metadata while the available product is within the field of view of the imaging device.

In certain embodiments, metadata extracted prior to the online session includes a portion of a metadata set stored in the storage location corresponding to the available product. In these embodiments, the method 860 further includes determining that the metadata set includes an additional piece of metadata relative to the metadata extracted prior to the online session. Moreover, in these embodiments, the method 860 further includes causing each external user computing device connected to the online session to display the metadata extracted prior to the online session and the additional piece of metadata while the available product is within a field of view of the imaging device.

In some embodiments, the method 860 includes training a machine learning (ML) model with a plurality of training data that includes training image data of available products and training price values corresponding to the training image data. The ML model may be trained to output an available product identification value and a preliminary price value corresponding to the available products. Further in these embodiments, the method 860 may include applying the ML model to the image or the subsequent image of the available product to output an available product identification value and a preliminary price value corresponding to the available product.

Additional Considerations

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims. By way of example, and not limitation, the disclosure herein contemplates at least the following aspects:

Thus, many modifications and modifications and variations may be made in the techniques and structures described and illustrated herein without departing from the spirit and scope of the present claims. Accordingly, it should be understood that the methods and apparatus described herein are illustrative only and are not limiting upon the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Unless a claim element is defined by reciting the word "means" and a function without the recital of any structure, it is not intended that the scope of any claim element be interpreted based upon the application of 35 U.S.C. § 112(f). The systems and methods described herein are directed to an improvement to computer functionality, and improve the functioning of conventional computers.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Throughout the present disclosure, embodiments are described in which various elements are optional—present in some, but not all, embodiments of the system. Where such elements are depicted in the accompanying figures and, specifically, in figures depicting block diagrams, the optional elements are generally depicted in dotted lines to denote their optional nature.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for generating dynamic user experience applications through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited, and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

By way of example, and not limitation, the disclosure herein contemplates at least the following aspects:

1. A system for digital item management and randomization techniques in an online platform, the system comprising:

one or more processors; and one or more memories storing non-transitory computer executable instructions that, when executed via the one or more processors, cause the one or more processors to:

assign a category placeholder to each external user of a set of external users that are participating in an online session on the online platform, render an animated randomization graphical overlay on a display of each external user computing device that is connected to the online session, each external user computing device operating on behalf of an external user, determine, by a randomization algorithm, a category member from a set of category members that is thereafter associated with a respective category placeholder for a duration of the online session, and cause the animated randomization graphical overlay to display an animated randomization sequence that selects the category member from the set of category members on the display of each external user computing device that is connected to the online session.

2. The system of aspect 1, wherein the set of category members is a set of available category members, and the instructions, when executed, further cause the one or more processors to:

iteratively determining, by the randomization algorithm, a respective category member from the set of available category members that is thereafter associated with a respective category placeholder for the duration of the online session, and wherein once a respective category member is associated with a respective category placeholder, the respective category member is removed from the set of available category members 3. The system of aspect 1, wherein a first external user has one category placeholder, and a second external user has two or more category placeholders.

4. The system of aspect 1, wherein the instructions, when executed, further cause the one or more processors to:

store metadata indicating associations of category members with the respective category placeholders, and automatically generate, at an ending of the online session and based on the metadata, shipping labels that indicate products corresponding to the category members and shipping information of the external user to which the category placeholder was assigned.

5. The system of aspect 1, wherein the instructions, when executed, further cause the one or more processors to:

for each external user participating in the online session, render a graphical indication of the category member associated with the category placeholder assigned to the external user proximate to an icon representative of the external user on the display of each external user computing device during the online session.

6. The system of aspect 1, wherein the instructions, when executed, further cause the one or more processors to:

receive, from a host user, a lock indication that prohibits additional external users from receiving category placeholder assignments.

7. The system of aspect 1, wherein the animated randomization graphical overlay includes a graphical representation of a wheel with a plurality of sections, each section corresponding to one of the category members from the set of category members, and the animated randomization sequence includes the wheel rotating until the wheel stops rotating and a section of the plurality of sections is selected.

8. The system of any one of aspects 1-7, configured to perform the actions of the system of any other suitable one of aspects 1-7.

9. A computer-implemented method performed via one or more processors for digital item management and randomization techniques in an online platform, the method comprising:

assigning, by a host user computing device, a category placeholder to each external user of a set of external users that are participating in an online session on the online platform;

rendering an animated randomization graphical overlay on a display of each external user computing device that is connected to the online session, each external user computing device operating on behalf of an external user;

determining, by a randomization algorithm, a category member from a set of category members that is thereafter associated with a respective category placeholder for a duration of the online session; and causing the animated randomization graphical overlay to display an animated randomization sequence that selects the category member from the set of category members on the display of each external user computing device that is connected to the online session.

10. The computer-implemented method of aspect 9, further comprising the actions of the systems of any one of aspects 1-8.

11. One or more computer readable media storing non-transitory computer executable instructions for digital item management and randomization techniques in an online platform that, when executed via one or more processors of one or more servers, cause the one or more servers to:

assign a category placeholder to each external user of a set of external users that are participating in an online session on the online platform;

render an animated randomization graphical overlay on a display of each external user computing device that is connected to the online session, each external user computing device operating on behalf of an external user;

determine, by a randomization algorithm, a category member from a set of category members that is thereafter associated with a respective category placeholder for a duration of the online session; and cause the animated randomization graphical overlay to display an animated randomization sequence that selects the category member from the set of category members on the display of each external user computing device that is connected to the online session.

12. The one or more computer readable media of aspect 11, comprising instructions to perform the actions of the systems of any one of aspects 1-8.

13. The one or more computer readable media of aspect 11, comprising instructions to perform the method of aspect 9 or 10.

14. Any one of aspects 1-13 in combination with any other suitable one of aspects 1-13.

15. A system for digital item management and randomization techniques in an online platform, the system comprising:

one or more processors; and one or more memories storing non-transitory computer executable instructions that, when executed via the one or more processors, cause the one or more processors to:

receive, during an online session on the online platform, an additional input layer for rendering on a display of each external user computing device that is connected to the online session, the online session including rendering a real-time video stream input from a host user computing device on the display of each external user computing device connected to the online session, layer the additional input layer with the real-time video stream input in an order defined by a host user operating the host user computing device, flatten the additional input layer and the real-time video stream input into a single layer video input stream, and cause the single layer video input stream to render on the display of each external user computing device during the online session.

16. The system of aspect 15, wherein the instructions, when executed, further cause the one or more processors to:

receive, from the host user computing device, an input requesting one or more additional input layer options;

retrieve, from an input layer database, the one or more additional input layer options; and render, at a display of the host user computing device, the one or more input layer options.

17. The system of aspect 15, wherein the additional input layer includes at least one of: (i) an additional text layer, (ii) an additional video stream input, (iii) a video filter, (iv) an animation sequence, or (v) a visual graphic.

18. The system of aspect 15, wherein the additional input layer includes at least a first additional input layer and a second additional input layer, and the instructions, when executed, further cause the one or more processors to:
receive, from the host user computing device, an input indicating that the order includes both the first additional input layer and the second additional input layer layered on top of the real-time video input stream and at least one of: (i) the first additional input layer layered on top of the second additional input layer or (ii) the second additional input layer layered on top of the first additional input layer.

19. The system of aspect 15, wherein the instructions, when executed, further cause the one or more processors to:
receive, from the host user computing device, an input indicating the order; and
generate a recommendation corresponding to the order that includes at least one of: (i) a recommended adjustment to the order or (ii) a recommended additional input layer.

20. The system of aspect 15, wherein the one or more memories additionally store an input layer flattening algorithm, and the instructions, when executed, further cause the one or more processors to flatten the additional input layer and the real-time video stream input into a single layer video input stream by:
applying the input layer flattening algorithm to the additional input layer and the real-time video stream input.

21. The system of any one of aspects 15-20, configured to perform the actions of the system of any other suitable one of aspects 15-20.

22. A computer-implemented method performed via one or more processors for digital item management and randomization techniques in an online platform, the method comprising:
receiving, during an online session on the online platform, an additional input layer for rendering on a display of each external user computing device that is connected to the online session, the online session including rendering a real-time video stream input from a host user computing device on the display of each external user computing device connected to the online session;
layering the additional input layer with the video stream input in an order defined by a host user operating the host user computing device;
flattening the additional input layer and the video stream input into a single layer video input stream; and
causing the single layer video input stream to render on the display of each external user computing device during the online session.

23. The computer-implemented method of aspect 22, further comprising the actions of the systems of any one of aspects 15-20.

24. One or more computer readable media storing non-transitory computer executable instructions for digital item management and randomization techniques in an online platform that, when executed via one or more processors of one or more servers, cause the one or more servers to:

receive, during an online session on the online platform, an additional input layer for rendering on a display of each external user computing device that is connected to the online session, the online session including rendering a real-time video stream input from a host user computing device on the display of each external user computing device connected to the online session;
layer the additional input layer with the video stream input in an order defined by a host user operating the host user computing device;
flatten the additional input layer and the video stream input into a single layer video input stream; and
cause the single layer video input stream to render on the display of each external user computing device during the online session.

25. The one or more computer readable media of aspect 24, comprising instructions to perform the actions of the systems of any one of aspects 15-20.

26. The one or more computer readable media of aspect 24, comprising instructions to perform the method of aspect 22 or 23.

27. Any one of aspects 15-26 in combination with any other suitable one of aspects 15-26.

28. A system for digital item management and randomization techniques in an online platform, the system comprising:
one or more processors; and
one or more memories storing non-transitory computer executable instructions that, when executed via the one or more processors, cause the one or more processors to:
store, during an online session on the online platform, an association indication between an available product in the online session and an external user participating in the online session,
receive an acceptance indication for an integrated grading option from the external user,
after the online session has concluded, automatically generate a shipping label that causes the available product associated with the external user to be shipped to a grading provider prior to shipment to the external user,
receive, from a grading provider device, a grading value corresponding to the available product, and
store the grading value corresponding to the available product in a grading database that includes a storage location associated with prior grading values of the available product and prior sale values of the available product.

29. The system of aspect 28, wherein the grading database includes a host profile corresponding to a host user that is conducting the online session, and the instructions, when executed, further cause the one or more processors to:
update the host profile with the grading value corresponding to the available product; and
display the grading value as part of a user interface rendered during a subsequent online session when the host user offers the available product during the subsequent online session.

30. The system of aspect 28, wherein a plurality of external users participate in the online session, and the instructions, when executed, further cause the one or more processors to:
render at a display of each external user computing device the integrated grading option;

receive a declination indication for the automated grading option from a portion of the plurality of external users; and after the online session has concluded, automatically generate shipping labels for the portion of the plurality of users that causes available products associated with the portion of the plurality of users to be shipped directly to the portion of the plurality of users.

31. The system of aspect 28, wherein the instructions, when executed, further cause the one or more processors to:

store a sale value of the available product from the online session in the storage location;

access the storage location to retrieve the prior grading values of the available product and prior sale values of the available product;

calculate one or more grading metrics corresponding to the available product that include the grading value and the sale value from the online session; and store the one or more grading metrics in the storage location.

32. The system of aspect 28, wherein the instructions, when executed, further cause the one or more processors to:

train, by the one or more processors, a machine learning (ML) model with a plurality of training data that includes training image data of available products and training grading value corresponding to the training image data, the ML model trained to output a preliminary grading value corresponding to the available products;

capture, by an imaging device, an image of the available product that includes a plurality of image data representative of the available product; and apply, by the one or more processors, the ML model to the plurality of image data to output a preliminary grading value corresponding to the available product.

33. The system of aspect 32, wherein the plurality of training data further includes a plurality of training price values of the available products, the ML model is further configured to output a preliminary price value corresponding to the available products, and the instructions, when executed, further cause the one or more processors to:

apply, by the one or more processors, the ML model to the plurality of image data to output the preliminary grading value and a preliminary price value corresponding to the available product.

34. The system of aspect 32, wherein the instructions, when executed, further cause the one or more processors to:

render, at a display of an external user computing device of the external user, the preliminary grading value; and upon receiving an interaction with the preliminary grading value from the external user, displaying at least a portion of the plurality of image data with a preliminary grading value indication.

35. The system of aspect 32, wherein the instructions, when executed, further cause the one or more processors to:

re-train the ML model based on the grading value received from the grading provider device and the preliminary grading value.

36. The system of any one of aspects 28-35, configured to perform the actions of the system of any other suitable one of aspects 28-35.

37. A computer-implemented method performed via one or more processors for digital item management and randomization techniques in an online platform, the method comprising:

storing, during an online session on the online platform, an association indication between an available product in the online session and an external user participating in the online session;

receiving an acceptance indication for an integrated grading option from the external user;

after the online session has concluded, automatically generating a shipping label that causes the available product associated with the external user to be shipped to a grading provider prior to shipment to the external user;

receiving, from a grading provider device, a grading value corresponding to the available product; and storing the grading value corresponding to the available product in a grading database that includes a storage location associated with prior grading values of the available product and prior sale values of the available product.

38. The computer-implemented method of aspect 37, further comprising the actions of the systems of any one of aspects 28-36.

39. One or more computer readable media storing non-transitory computer executable instructions for digital item management and randomization techniques in an online platform that, when executed via one or more processors of one or more servers, cause the one or more servers to:

store, during an online session on the online platform, an association indication between an available product in the online session and an external user participating in the online session;

receive an acceptance indication for an integrated grading option from the external user;

after the online session has concluded, automatically generate a shipping label that causes the available product associated with the external user to be shipped to a grading provider prior to shipment to the external user;

receive, from a grading provider device, a grading value corresponding to the available product; and store the grading value corresponding to the available product in a grading database that includes a storage location associated with prior grading values of the available product and prior sale values of the available product.

40. The one or more computer readable media of aspect 39, comprising instructions to perform the actions of the systems of any one of aspects 28-35.

41. The one or more computer readable media of aspect 39, comprising instructions to perform the method of aspect 37 or 38.

42. Any one of aspects 28-41 in combination with any other suitable one of aspects 28-41.

43. A system for digital item management and randomization techniques in an online platform, the system comprising:

one or more processors; and one or more memories storing non-transitory computer executable instructions that, when executed via the one or more processors, cause the one or more processors to:

capture, by an imaging device, an image of an available product prior to an online session on the online platform, execute a machine vision algorithm on the image to extract metadata corresponding to the available product, store the metadata in a database with a storage location corresponding to the available product, during the online session, capture, by the imaging device, a subsequent image of the available product, execute the machine vision algorithm to determine that the available product is represented in the subsequent image, and cause each external user computing device connected to the online session to display the metadata while the available product is within a field of view of the imaging device.

44. The system of aspect 43, wherein the machine vision algorithm includes an optical character recognition (OCR) algorithm.

45. The system of aspect 43, wherein the instructions, when executed, further cause the one or more processors to:

receive an input from a first external user that includes at least a portion of the metadata corresponding to the available product;

searching the database for any storage location with metadata corresponding to the input;

retrieving a link to the online session based on the metadata stored in the storage location; and causing a first external user computing device of the first external user to display the link to the online session.

46. The system of aspect 43, wherein the instructions, when executed, further cause the one or more processors to:

during the online session, execute the machine vision algorithm on the subsequent image to extract additional metadata corresponding to the available product;

store the additional metadata in the storage location corresponding to the available product; and cause each external user computing device connected to the online session to display the additional metadata while the available product is within the field of view of the imaging device.

47. The system of aspect 43, wherein metadata extracted prior to the online session includes a portion of a metadata set stored in the storage location corresponding to the available product, and the instructions, when executed, further cause the one or more processors to:

determine that the metadata set includes an additional piece of metadata relative to the metadata extracted prior to the online session; and cause each external user computing device connected to the online session to display the metadata extracted prior to the online session and the additional piece of metadata while the available product is within a field of view of the imaging device.

48. The system of aspect 43, wherein the metadata includes at least one of: (i) a name of the available product, (ii) a date of production, (iii) a category member, or (iv) a manufacturer of the available product.

49. The system of aspect 43, wherein the instructions, when executed, further cause the one or more processors to:

train, by the one or more processors, a machine learning (ML) model with a plurality of training data that includes training image data of available products and training price values corresponding to the training image data, the ML model trained to output a training available product identification value a training preliminary price value corresponding to the available products; and apply, by the one or more processors, the ML model to the image or the subsequent image of the available product to output an available product identification value and a preliminary price value corresponding to the available product.

50. The system of any one of aspects 43-49, configured to perform the actions of the system of any other suitable one of aspects 43-49.

51. A computer-implemented method performed via one or more processors for digital item management and randomization techniques in an online platform, the method comprising:

capturing, by an imaging device, an image of an available product prior to an online session on the online platform;

executing a machine vision algorithm on the image to extract metadata corresponding to the available product;

storing the metadata in a database with a storage location corresponding to the available product;

during the online session, capturing, by the imaging device, a subsequent image of the available product;

executing the machine vision algorithm to determine that the available product is represented in the subsequent image; and causing each external user computing device connected to the online session to display the metadata while the available product is within a field of view of the imaging device.

52. The computer-implemented method of aspect 51, further comprising the actions of the systems of any one of aspects 43-50.

53. One or more computer readable media storing non-transitory computer executable instructions for digital item management and randomization techniques in an online platform that, when executed via one or more processors of one or more servers, cause the one or more servers to:

capture, by an imaging device, an image of an available product prior to an online session on the online platform;

execute a machine vision algorithm on the image to extract metadata corresponding to the available product;

store the metadata in a database with a storage location corresponding to the available product;

during the online session, capture, by the imaging device, a subsequent image of the available product;

execute the machine vision algorithm to determine that the available product is represented in the subsequent image; and cause each external user computing device connected to the online session to display the metadata while the available product is within a field of view of the imaging device.

54. The one or more computer readable media of aspect 53, comprising instructions to perform the actions of the systems of any one of aspects 43-50.

55. The one or more computer readable media of aspect 53, comprising instructions to perform the method of aspect 51 or 52.

56. Any one of aspects 43-55 in combination with any other suitable one of aspects 43-55.

57. Any one of aspects 1-14, 15-27, 28-42, or 43-56 in combination with any other one of aspects 1-14, 15-27, 28-42, or 43-56.

The invention claimed is:

1. A system for digital item management and randomization techniques in an online platform, the system comprising:

one or more processors; and one or more memories storing non-transitory computer executable instructions that, when executed via the one or more processors, cause the one or more processors to:

assign a category placeholder to each external user of a set of external users that are participating in an online session on the online platform, render an animated randomization graphical overlay on a display of each external user computing device that is connected to the online session, each external user computing device operating on behalf of an external user, determine, by a randomization algorithm, a category member from a set of category members that is thereafter associated with a respective category placeholder for a duration of the online session, and cause the animated randomization graphical overlay to display an animated randomization sequence that selects the category member from the set of category members on the display of each external user computing device that is connected to the online session.

2. The system of claim 1, wherein the set of category members is a set of available category members, and the instructions, when executed, further cause the one or more processors to:

iteratively determine, by the randomization algorithm, a respective category member from the set of available category members that is thereafter associated with a respective category placeholder for the duration of the online session; and wherein once a respective category member is associated with a respective category placeholder, the respective category member is removed from the set of available category members.

3. The system of claim 1, wherein a first external user has one category placeholder, and a second external user has two or more category placeholders.

4. The system of claim 1, wherein the animated randomization graphical overlay includes a graphical representation of a wheel with a plurality of sections, each section corresponding to one of the category members from the set of category members, and the animated randomization sequence includes the wheel rotating until the wheel stops rotating and a section of the plurality of sections is selected.

5. The system of claim 1, wherein the instructions, when executed, further cause the one or more processors to:

receive, from a host user, a lock indication that prohibits additional external users from receiving category placeholder assignments.

6. The system of claim 1, wherein the instructions, when executed, further cause the one or more processors to:

receive, during the online session on the online platform, an additional input layer for rendering on a display of each external user computing device that is connected to the online session, the online session including rendering a real-time video stream input from a host user computing device on the display of each external user computing device connected to the online session; and cause the additional input layer to render on the display of each external user computing device during the online session.

7. The system of claim 6, wherein the instructions, when executed, further cause the one or more processors to:

receive, from the host user computing device, an input requesting one or more additional input layer options;

retrieve, from an input layer database, the one or more additional input layer options; and render, at a display of the host user computing device, the one or more input layer options.

8. The system of claim 6, wherein the additional input layer includes at least one of: (i) an additional text layer, (ii) an additional video stream input, (iii) a video filter, (iv) an animation sequence, or (v) a visual graphic.

9. The system of claim 1, wherein the instructions, when executed, further cause the one or more processors to:

determine a preliminary grading value and a preliminary price value corresponding to an available product in the online session; and render, at the display of each external user computing device that is connected to the online session, the preliminary grading value and the preliminary price value.

10. The system of claim 1, wherein the instructions, when executed, further cause the one or more processors to:

train a machine learning (ML) model with a plurality of training data that includes training image data of a set of available products, training grading values corresponding to the training image data, and a plurality of training price values corresponding to the training image data, the ML model trained to output a preliminary grading value and a preliminary price value corresponding to each available product of the set of available products; and apply the ML model to a plurality of image data representative of a first available product to output a preliminary grading value and a preliminary price value corresponding to the first available product.

11. A computer-implemented method performed via one or more processors for digital item management and randomization techniques in an online platform, the method comprising:

assigning, by a host user computing device, a category placeholder to each external user of a set of external users that are participating in an online session on the online platform;

rendering an animated randomization graphical overlay on a display of each external user computing device that is connected to the online session, each external user computing device operating on behalf of an external user;

determining, by a randomization algorithm, a category member from a set of category members that is thereafter associated with a respective category placeholder for a duration of the online session; and causing the animated randomization graphical overlay to display an animated randomization sequence that selects the category member from the set of category members on the display of each external user computing device that is connected to the online session.

12. The computer-implemented method of claim 11, wherein the set of category members is a set of available category members, and the method further comprises:

iteratively determining, by the randomization algorithm, a respective category member from the set of available category members that is thereafter associated with a respective category placeholder for the duration of the online session; and wherein once a respective category member is associated with a respective category placeholder, the respective category member is removed from the set of available category members.

13. The computer-implemented method of claim 11, wherein a first external user has one category placeholder, and a second external user has two or more category placeholders.

14. The computer-implemented method of claim 11, wherein the animated randomization graphical overlay includes a graphical representation of a wheel with a plurality of sections, each section corresponding to one of the category members from the set of category members, and the animated randomization sequence includes the wheel rotating until the wheel stops rotating and a section of the plurality of sections is selected.

15. The computer-implemented method of claim 11, further comprising:

receiving, from a host user, a lock indication that prohibits additional external users from receiving category placeholder assignments.

16. The computer-implemented method of claim 11, further comprising:

receiving, during the online session on the online platform, an additional input layer for rendering on a display of each external user computing device that is connected to the online session, the online session including rendering a real-time video stream input from a host user computing device on the display of each external user computing device connected to the online session; and causing the additional input layer to render on the display of each external user computing device during the online session.

17. The computer-implemented method of claim 16, further comprising:

receiving, from the host user computing device, an input requesting one or more additional input layer options;

retrieving, from an input layer database, the one or more additional input layer options; and rendering, at a display of the host user computing device, the one or more input layer options.

18. The computer-implemented method of claim 16, wherein the additional input layer includes at least one of: (i) an additional text layer, (ii) an additional video stream input, (iii) a video filter, (iv) an animation sequence, or (v) a visual graphic.

19. The computer-implemented method of claim 11, further comprising:

determining a preliminary grading value and a preliminary price value corresponding to an available product in the online session; and rendering, at the display of each external user computing device that is connected to the online session, the preliminary grading value and the preliminary price value.

20. One or more non-transitory computer readable media storing computer executable instructions for digital item management and randomization techniques in an online platform that, when executed via one or more processors of one or more servers, cause the one or more servers to:

assign a category placeholder to each external user of a set of external users that are participating in an online session on the online platform;

render an animated randomization graphical overlay on a display of each external user computing device that is connected to the online session, each external user computing device operating on behalf of an external user;

determine, by a randomization algorithm, a category member from a set of category members that is thereafter associated with a respective category placeholder for a duration of the online session; and cause the animated randomization graphical overlay to display an animated randomization sequence that selects the category member from the set of category members on the display of each external user computing device that is connected to the online session.

* * * * *